US012135949B1

(12) United States Patent
Cameron et al.

(10) Patent No.: US 12,135,949 B1
(45) Date of Patent: Nov. 5, 2024

(54) LAYERED MEASUREMENT, GRADING AND EVALUATION OF PRETRAINED ARTIFICIAL INTELLIGENCE MODELS

(71) Applicant: Citibank, N.A., New York, NY (US)

(72) Inventors: William Franklin Cameron, Jacksonville, FL (US); Miriam Silver, Tel Aviv (IL); Manjit Rajaretnam, Irving, TX (US)

(73) Assignee: CITIBANK, N.A.

( * ) Notice: Subject to any disclaimer, the term of this patent is extended or adjusted under 35 U.S.C. 154(b) by 0 days.

(21) Appl. No.: 18/759,648

(22) Filed: Jun. 28, 2024

Related U.S. Application Data

(63) Continuation-in-part of application No. 18/759,617, filed on Jun. 28, 2024, which is a continuation-in-part of application No. 18/737,942, filed on Jun. 7, 2024.

(51) Int. Cl.
  *G06F 17/00* (2019.01)
  *G06F 40/40* (2020.01)
  *G06F 40/106* (2020.01)

(52) U.S. Cl.
  CPC .......... *G06F 40/40* (2020.01); *G06F 40/106* (2020.01)

(58) Field of Classification Search
  CPC ................ G06F 40/40; G06F 40/106
  See application file for complete search history.

(56) References Cited

U.S. PATENT DOCUMENTS 11,164,078 B2 * 11/2021 Jin .................... G06N 3/048
11,521,716 B2 * 12/2022 Vianu ................ G16H 15/00
11,893,341 B2 *  2/2024 Itani ................. G06F 40/177

(Continued)

FOREIGN PATENT DOCUMENTS

CN  115796299 A *  3/2023 ............ G06F 8/31
CN  116775837 A *  9/2023

(Continued)

OTHER PUBLICATIONS

Chen, Kua, et at, Automated Domain Modeling with Large Language Models: A Comparative Study, 2023 ACM/IEEE 26th International Conference on Model Driven Engineering Languages and Systems (MODELS) (2023, pp. 162-172) (Year: 2023).*
Wang, Yudong, et al, "Exploring Activation Patterns of Parameters in Language Models", ARXIV ID: 2405.17799 Publication Date: May 27, 2024, pp. 1-23. (Year: 2024).*

(Continued)

*Primary Examiner* — Laurie A Ries
(74) *Attorney, Agent, or Firm* — Perkins Coie LLP

(57) ABSTRACT

Systems and methods for evaluating a pre-trained artificial intelligence (AI) model using layered prompts. The system obtains a set of application domains in which the AI model will be used, and a set of guidelines that define one or more operational boundaries of the AI model. The system determines a set of layers, where each layer is associated with corresponding guidelines and mapped to a set of variables and benchmarks. Each variable represents an attribute within the guidelines and each benchmark indicates the degree of satisfaction of the AI model with the guidelines. The AI model is dynamically evaluated against these benchmarks using a series of assessments. Subsequent assessments are dynamically constructed based on the outcomes of previous assessments. Scores are assigned to the AI model for each layer by comparing the expected and actual responses. The results are then displayed in a graphical user interface (GUI).

20 Claims, 13 Drawing Sheets

(56) References Cited

U.S. PATENT DOCUMENTS

| | | | |
|---|---|---|---|
| 12,001,462 B1* | 6/2024 | Madisetti | G06F 40/284 |
| 12,061,970 B1* | 8/2024 | Lo | G06N 3/10 |
| 2020/0043164 A1 | 2/2020 | Fuchs et al. | |
| 2020/0334326 A1 | 10/2020 | Zhang et al. | |
| 2020/0349466 A1 | 11/2020 | Hoogerwerf et al. | |
| 2021/0012486 A1 | 1/2021 | Huang et al. | |
| 2023/0018960 A1* | 1/2023 | Ardel | G06N 3/08 |
| 2023/0274089 A1* | 8/2023 | Tunstall-Pedoe | G06F 40/40 704/2 |
| 2023/0316003 A1* | 10/2023 | Friedman | G06N 3/0442 704/9 |
| 2024/0095463 A1* | 3/2024 | Leary | G06F 40/20 |
| 2024/0111960 A1* | 4/2024 | Earle | G06F 40/30 |
| 2024/0146734 A1* | 5/2024 | Southgate | G06F 21/6227 |
| 2024/0202539 A1* | 6/2024 | Poirier | G06F 16/3347 |
| 2024/0242040 A1* | 7/2024 | Cogswell | G06F 40/40 |
| 2024/0273306 A1* | 8/2024 | Somaiya | G06F 40/186 |

FOREIGN PATENT DOCUMENTS

| | | | | |
|---|---|---|---|---|
| CN | 117391216 A | * | 1/2024 | |
| CN | 117453915 A | * | 1/2024 | |
| CN | 117633174 B | * | 6/2024 | |
| CN | 118170874 A | * | 6/2024 | G06F 40/40 |
| WO | WO-2022135973 A1 | * | 6/2022 | G06F 18/214 |
| WO | WO-2023161630 A1 | * | 8/2023 | G06F 40/279 |

OTHER PUBLICATIONS

Brown, Nik Bear, "Enhancing Trust in LLMs: Algorithms for Comparing and Interpreting LLMs", ARXIV ID: 2406.01943 Publication Date: Jun. 3, 2024, pp. 1-58. (Year: 2024).*

Mathews, A. W., "What AI Can Do in Healthcare—and What It Should Never Do," The Wall Street Journal, published on Aug. 21, 2024, retrieved on Sep. 5, 2024, https://www.wsj.com.

AI Risk Management Framework NIST, retrieved on Jun. 17, 2024, https://www.nist.gov/itl/ai-risk-management-framework.

Independent analysis of AI language models and API providers. Artificial Analysis, retrieved on Jun. 13, 2024, https://artificialanalysis.ai/, 11 pages.

Brown, D., et al., "The Great AI Challenge: We Test Five Top Bots on Useful, Everyday Skills," The Wall Street Journal, published May 25, 2024.

Dong, Y., et al., "Building Guardrails for Large Language Models," https://ar5iv.labs.arxiv.org/html/2402.01822v1, published May 29, 2024, 20 pages.

Mavrepis, P., et al., "XAI for All: Can Large Language Models Simplify Explainable AI?," https://arxiv.org/abs/2401.13110, Jan. 23, 2024, 10 pages.

Mollick, E., "Latent Expertise: Everyone is in R&D," One Useful Thing, published on Jun. 20, 2024, https://www.oneusefulthing.org/p/latent-expertise-everyone-is-in-r.

Zhao, H., et al., "Explainability for Large Language Models: A Survey," https://arxiv.org/abs/2309.01029, Nov. 28, 2024, 38 pages.

Aggarwal, Nitin , "Why measuring your new AI is essential to its succes", KPIs for gen AI: Why measuring your new AI is essential to its succes, 7 pages.

AI , "What is AI Verify?", What is AI Verify—AI Verify Foundation.

Altman, Sam , "Sam Altman Admits That OpenAI Doesn't Actually Understand How Its AI Works", Sam Altman Admits That OpenAI Doesn't Actually Understand How Its AI Works—"We certainly have not solved interpretability.", 4 pages.

Anthrop/C , "Mapping the Mind of a Large Language Model", Mapping the Mind of a Large Language Model, May 21, 2024.

Claburn, Thomas , "OpenAI's GPT-4 can exploit real vulnerabilities by reading security advisories", OpenAI's GPT-4 can exploit real vulnerabilities by reading security advisories, Apr. 17, 2024, 3 pages.

Marshall, Andrew , "Threat Modeling AI/ML Systems and Dependencies", Threat Modeling AI/ML Systems and Dependencies, Nov. 2, 2022, 27 pages.

Roose, Kevin , "A.I. Has a Measurement Problem", A.I. Has a Measurement Problem, Apr. 15, 2024, 5 pages.

Roose, Kevin , "A.I.'s Black Boxes Just Got a Little Less Mysterious", A.I.'s Black Boxes Just Got a Little Less Mysterious, May 21, 2024, 5 pages.

Shah, Harshay , "Decomposing and Editing Predictions by Modeling Model Computation", Decomposing and Editing Predictions by Modeling Model Computation, 5 pages.

Shankar, Ram , "Failure Modes in Machine Learning", , Nov. 2019, 14 pages.

Teo, Josephine , "Singapore launches Project Moonshot", Singapore launches Project Moonshot—a generative Artificial Intelligence testing toolkit to address LLM safety and security challenges, May 31, 2024, 8 pages.

Dakhel et al., Apr. 2024, "Effective test generation using pre-trained Large Language Models and mutation testing" (Year: 2024).

Do et al., Apr. 3, 2024, "Automatic Prompt Selection for Large Language Models" (Year: 2024).

* cited by examiner

LAYERED MEASUREMENT, GRADING AND EVALUATION OF PRETRAINED ARTIFICIAL INTELLIGENCE MODELS

CROSS-REFERENCE TO RELATED APPLICATION(S)

This application is a continuation-in-part of U.S. patent application Ser. No. 18/759,617 entitled "LAYERED MULTI-PROMPT ENGINEERING FOR PRE-TRAINED LARGE LANGUAGE MODELS" filed on Jun. 28, 2024, which is a continuation-in-part of U.S. patent application Ser. No. 18/737,942 entitled "SYSTEM AND METHOD FOR CONSTRUCTING A LAYERED ARTIFICIAL INTELLIGENCE MODEL" filed on Jun. 7, 2024. The content of the foregoing applications are incorporated herein by reference in its entirety.

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. AI models provide a more dynamic and nuanced approach to security by continuously analyzing vast amounts of data to identify potential threats and vulnerabilities. However, there is a lack of transparency in AI models. Unlike traditional rule-based methods and signature-based detection techniques, which are more transparent, AI models operate on algorithms that are often opaque to end-users since the user is only exposed to the AI model's received input and the AI model's output. The lack of visibility into the inner workings of AI models raises concerns about the AI model's reliability and trustworthiness, as security analysts are unable to verify the integrity of the AI model or assess the AI model's susceptibility to adversarial attacks.

Figure 1:
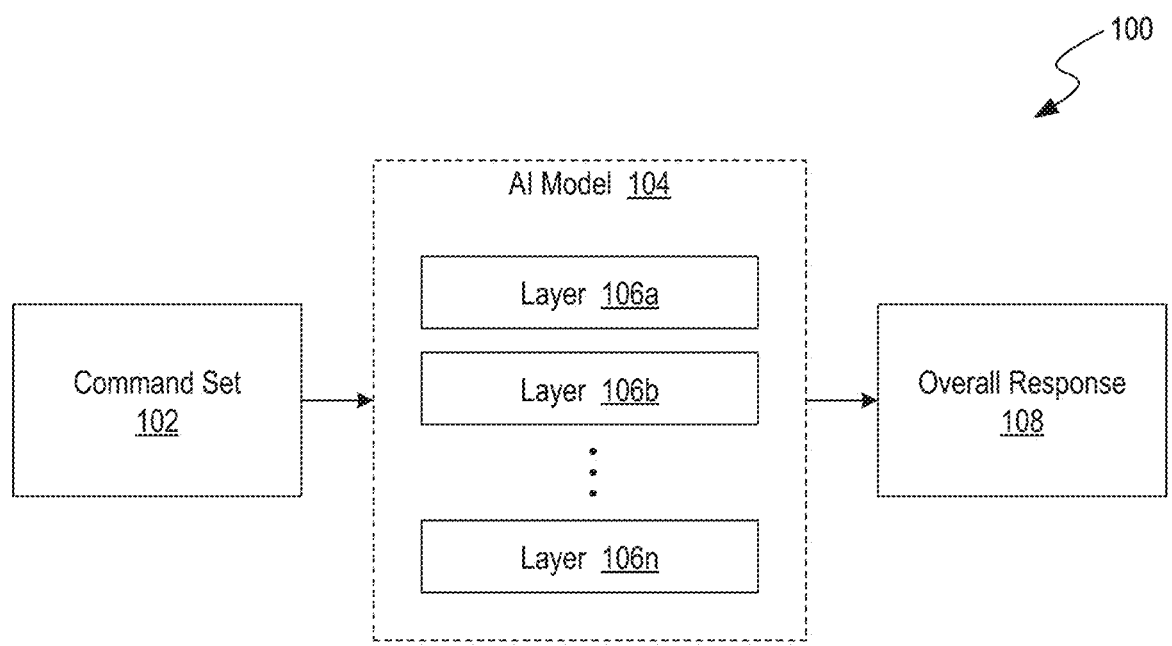
FIG. 1 is an illustrative diagram illustrating an example environment of a layered artificial intelligence (AI) model, in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

AI applications offer a powerful framework for extracting insights and making predictions from data. One of the key advantages of AI applications lies in an AI model's ability to automatically identify patterns and relationships within complex datasets, even in the absence of explicit programming. This capability enables AI applications to uncover relationships, predict future outcomes, and drive data-driven decision-making across various fields. However, the rapid deployment and integration of LLMs have raised significant concerns regarding their risks including, but not limited to, ethical use, data biases, privacy and robustness. Further, as AI technologies continue to evolve, so do the regulatory landscapes governing the created AI applications. AI applications face increasing scrutiny and legal obligations to ensure that AI applications comply with the evolving regulations and ethical standards.

Traditional approaches to using AI models, for example, to secure computing platforms typically involve users providing an input (e.g., a command set or prompt) and receiving output predictions. However, the inner workings of the AI model, including the algorithms and decision-making processes employed, remain opaque to the user. From the user's perspective, the AI model functions as a "black box," where the input is fed into the system, and the output prediction is produced without visibility into the underlying logic. Once the input data is processed by the AI model, users receive output predictions (e.g., in a cybersecurity context, an AI model could indicate whether each access attempt is deemed authorized or unauthorized). These predictions can inform security decisions and actions taken by users or automated systems. Since the AI model is a "black box," attempts to prevent unwanted AI model outputs include filtering out potentially risky inputs using pre-defined rulesets, rather than addressing the root cause of the problem (e.g., being unable to understand the decision-making processes of the AI model). Without understanding how the AI model processes information and generates outputs, simply filtering inputs through pre-defined rules is a superficial measure that can easily be circumvented or fail to catch unforeseen risky inputs. Moreover, this approach does not improve the model's underlying reliability or transparency.

A common issue faced by engineers due to the lack of visibility into AI algorithm logic is the inability to validate the accuracy and effectiveness of the AI model's outputs. Security professionals require confidence in the methodologies used by AI models to make informed decisions about platform security. Without a clear understanding of the underlying logic, engineers may be hesitant to trust the outputs of AI models. Moreover, the lack of transparency into AI algorithm logic hinders efforts to diagnose and address security vulnerabilities effectively. In the event of a security breach or incident, engineers need to understand how the AI model arrived at its conclusions to identify the root cause of the problem and implement appropriate remediation measures. However, without insight into the decision-making process of the algorithms, diagnosing and resolving security issues becomes significantly more challenging. Additionally, the lack of visibility into AI algorithm logic can exacerbate concerns about adherence to regulations or guidelines. If engineers cannot discern how AI models weigh different factors or make decisions, it becomes difficult to ensure that the algorithms adhere to the regulations or guidelines. The opacity may lead to unintended consequences, such as disproportionate impacts on certain user groups or overlooking security vulnerabilities. Further, the need to work with multiple requirements/dimensions (such as, compliance with regulations; ethical principles such as fairness, privacy, and IP; ensuring outputs free from unintended responses such as offensive or hate speech; ensuring outputs free from incorrect/unsubstantiated responses/hallucinations; etc.) makes the challenges worse, especially when some requirements can be conflicting. Such complexity requires a sophisticated solution system.

Another traditional approach to using AI models includes constructing prompts (e.g., prompt engineering) for evaluating or assessing the performance of AI models such as large language models (LLMs) by using single or multiple prompts designed to guide the behavior and responses of the LLMs. However, rather than addressing the root of the problem (e.g., being unable to understand the decision-making processes of the "black box" AI model), constructing prompts blindly by using traditional single-prompt methods often lead to prompts that are overly complex and ambiguous. The LLM may struggle to parse the various elements accurately, resulting in responses that are inconsistent or misaligned with the user's expectations. For instance, a single prompt designed to assess an LLM's understanding of legal principles may mix questions about case law, statutory interpretation, and ethical considerations, leading to muddled and unfocused answers. Traditional prompt engineering does not provide the necessary transparency and accountability. Without a structured approach, it is challenging to trace the LLM's decision-making process and understand how specific responses were generated. The opacity is particularly problematic for compliance and auditing purposes, especially in regulated industries where understanding the rationale behind decisions affects regulatory compliance. For example, in the context of regulatory compliance in finance, knowing how an LLM arrived at a particular recommendation or decision (e.g., whether a particular customer is granted a loan) can directly correlate with whether the LLM aligns with legal requirements.

Yet another traditional approach to using AI models includes evaluating and assessing AI models with a broad, one-dimensional assessment that does not account for the complex "black box" nature of AI decision-making processes (e.g., how an AI model's prediction is a culmination of multiple decisions made). As a result, the evaluations and assessments often lack the transparency needed to understand the AI model's "black box" capabilities and limitations and can miss nuances in how an AI model performs across different contexts and scenarios, which leads to incomplete or misleading conclusions about the AI model's effectiveness and/or reliability. For example, traditional methods for evaluating and assessing AI models may offer an overall performance score or accuracy rate but fail to, during the assessment, break down the AI model's performance into discrete, layered assessments. Thus, it is challenging to identify the root causes of any deficiencies or to determine how well the AI model adheres to specific guidelines, such as ethical standards or regulatory requirements.

Further, traditional assessment approaches are often static and do not adapt to the evolving nature of AI models and their application domains. As AI models are deployed in dynamic environments with changing requirements, the static evaluation fails to capture the AI model's performance in real-world scenarios accurately. This can result in an AI model that appears effective in a controlled testing environment but underperforms in practical applications. Without a dynamic and layered evaluation, it is difficult to ensure that an AI model remains robust, reliable, and compliant over time as guidelines change. Additionally, the lack of a layered evaluation framework means that traditional methods do not provide a systematic way to test for specific issues, such as bias in training data or the AI model's ability to handle edge cases. The oversight can lead to problems in the deployment phase, where unanticipated biases or errors might emerge, potentially causing harm or unfair outcomes. The absence of detailed, layer-specific assessments makes it challenging to preemptively address these issues before the AI model is deployed, thereby increasing the risk associated with AI deployments.

Thus, there is a need for determining particular explanations of particular AI model outcomes. The inventors have developed an improved method and system for constructing a layered AI model that covers the development cycle (from requirements, to design, implementation, integration, deployment, verification and validation) of AI models. The method involves constructing a layered AI model by determining a set of layers, where each layer relates to a specific context/dimension. Within each layer, a set of variables is defined to capture attributes identified within the corresponding context. The variables serve as parameters for the layer-specific model logic, which generates layer-specific results in response to inputs. To construct the layered AI model, the determined set of layers is used to train an AI model. This training process involves developing layer-specific model logic for each layer, tailored to generate layer-specific results based on the corresponding set of variables. Once trained, the AI model is capable of applying the layer-specific model logic of each layer to a command set, thereby generating layer-specific responses. These responses include the layer-specific results and a set of descriptors indicating the model logic used for each layer. After generating layer-specific responses, the system aggregates them using predetermined weights for each layer. This aggregation process yields a set of overall responses to the command set, comprising an overall result and an overall set of descriptors associated with the layer-specific responses.

These descriptors provide insights into the decision-making process of the AI model, allowing users to understand how each layer contributes to the overall result.

Using a layered AI model, the system allows users to understand the specific contexts and variables considered at each layer, and thus offers the user a particular explanation for particular outcomes of the AI model. Each layer's model logic is constructed based on identifiable parameters and attributes associated with the corresponding context, making it easier for users to validate the accuracy of the outputs and identify potential sources of error more effectively. By breaking down the AI model into interpretable layers, rather than the AI model operating as a "black box," users can gain a clearer understanding of how the model arrives at its predictions, instilling confidence in the decisions made based on the AI model's outputs.

The inventors have further developed an improved method and system for constructing a layered prompt for evaluating and assessing an AI model. The method involves obtaining a set of application domains for a pre-trained LLM, which will be used to generate responses to inputs. By mapping each application domain to specific guidelines, the method defines the operational boundaries for the LLM. The method determines a set of layers/dimensions associated with these guidelines. Each layer includes variables representing attributes identified within the guidelines. Using these layers, the method constructs a first test case based on a scenario derived from the initial set of layers. This first test case includes a layered prompt and an expected response, and is designed to test the operational boundaries defined by the guidelines. The method then evaluates the LLM by supplying the first layered prompt to the LLM and receiving the corresponding responses. By comparing the expected response to the actual responses from the LLM, the method dynamically constructs a second test case. This second test case is based on a subsequent set of layers and includes another layered prompt and expected response, aiming to further test the LLM's boundaries. The method executes the second test case and displays the results on a graphical user interface (GUI). This display includes a graphical representation showing how well the LLM meets the guidelines and the evaluations from both test cases.

Using a layered multi-prompt approach, the system allows users to break down complex queries into manageable phases, with each prompt focusing on a specific aspect of the task, and thus offers the user a particular explanation for particular outcomes of the AI model. By dynamically modifying and generating new layers based on the responses from previous layers, rather than constructing prompts using a "black box" approach, the system can adapt to the evolving understanding of the LLM's behavior. Additionally, layered prompts improve the transparency in the decision-making process of LLMs by providing a structured and traceable framework for evaluating and assessing the LLMs' generated responses. Unlike traditional prompt engineering, which often results in a black-box understanding of the LLM since it is difficult to understand how specific outputs were derived, layered prompts decompose the decision-making process into distinct phases.

The inventors have additionally developed an improved method and system for a layered evaluation and assessment of an AI model. This method involves obtaining a set of application domains in which a pre-trained LLM will be used, and a set of guidelines for each application domain defining one or more operation boundaries of the pre-trained LLM. A set of layers/dimensions for the pre-trained LLM is determined, with each layer associated with one or more guidelines from the set of guidelines. Each layer within the set of layers is mapped to a set of variables and benchmarks. The variables can represent attributes identified within the guidelines of each corresponding layer, and the benchmarks can indicate the degree of satisfaction of the pre-trained LLM with the guidelines associated with each layer. Using the determined set of layers, the pre-trained LLM is dynamically evaluated against the corresponding sets of benchmarks through a series of layered assessments, where subsequent assessments occurring subsequent to previous assessments are dynamically constructed using the comparison of a layer-specific expected response of the previous assessments to a layer-specific model response received from the pre-trained LLM for the previous assessments. Scores are assigned to the pre-trained LLM for each layer based on the degree of satisfaction for each assessment in the layer in accordance with the benchmarks.

In various implementations, the scores are mapped to a graphical layout displayed on a graphical user interface (GUI) that includes a first graphical representation of each layer and a second graphical representation of the corresponding assigned score for each layer to provide a visualization of the LLM's performance across various layers and guidelines. Additionally, expressing the degree of satisfaction and/or score can be indicated with a binary indicator, a categorical classification, and/or a probability measure.

Using a layered evaluation approach, the system addresses the deficiencies of traditional AI model assessment methods by providing a more granular and comprehensive evaluation framework. Unlike traditional methods that offer a one-dimensional assessment, the layered approach breaks down the AI model's performance into distinct, understandable, modular components. By mapping each layer to specific guidelines and benchmarks, the system allows for a separate analysis of how well the AI model adheres to various criteria of the particular layer. The granularity ensures that the layered assessments capture nuances in the AI model's behavior across different contexts and scenarios, leading to more accurate and reliable conclusions about the AI model's decision-making processes.

Moreover, the layered evaluation framework is dynamic and adapts to the evolving nature of AI models and their application domains. Traditional static assessment approaches fail to account for the dynamic environments in which AI systems operate. By contrast, the layered evaluation can continually update the evaluation criteria and benchmarks (e.g., by dynamically constructing the assessments) based on the AI model's performance and changing benchmarks. This dynamic nature ensures that the AI model's performance is consistently monitored and assessed in practical applications.

Additionally, the layered approach systematically addresses specific issues such as bias in training data and the model's ability to handle edge cases. By incorporating layer-specific assessments that test for these problems, the system can identify and mitigate potential biases or errors before deployment. The proactive identification reduces the risk of harm or unfair outcomes in practical applications. The layer-specific evaluations ensure that the AI model is thoroughly evaluated for compliance with ethical standards and operational guidelines, leading to more reliable AI model deployments.

In the following description, for the purposes of explanation, numerous specific details are set forth in order to provide a thorough understanding of the implantations of the present technology. It will be apparent, however, to one skilled in the art that implementation of the present technology can practiced without some of these specific details.

While the present technology is described in detail for use with LLMs, one of skill in the art would understand that the same techniques could be applied, with appropriate modifications, to improve the prompt engineering to other generative models (e.g., GenAI, generative AI, GAI), making the technology a valuable tool for diverse applications beyond LLMs. Other generative models are equally appropriate after appropriate modifications.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Constructing a Layered AI Model

FIG. 1 is an illustrative diagram of an example environment 100 of a layered artificial intelligence (AI) model, in accordance with some implementations of the present technology. Environment 100 includes a command set 102, AI model 104, layers 106a-106n within the AI model 104, and overall response 108. AI model 104 is implemented using components of example computer system 1300 illustrated and described in more detail with reference to FIG. 13. Likewise, implementations of example environment 100 can include different and/or additional components or can be connected in different ways.

The command set 102 operates as an input into the AI model 104. The command set 102 consists of a set of instructions or queries directed toward the AI model, which can encompass a wide range of tasks or inquiries, depending on the specific application or use case of the AI model. For example, in a cybersecurity context, command set 102 can be a prompt that asks the AI model to predict whether an attempt to access a certain application is authentic. Command set 102, in a cybersecurity context, can range from routine security assessments and threat intelligence gathering to proactive threat hunting, incident response coordination, and remediation efforts. In another example, in a financial analysis setting, the command set 102 can consist of risk assessments for candidate loan applications. In some implementations, the command set can be structured in a standardized format to ensure consistency and interoperability across different interactions with the AI model.

Within the AI model 104 are multiple layers (e.g., layers 106a-n). Each layer 106a-n corresponds to a specific aspect or domain context relevant to the decision-making process within the AI model 104. Layers 106a-n can include specialized knowledge and logic tailored to specific domains or areas of expertise. For example, one layer can focus on demographic information, while another layer can analyze financial data or market trends. The particular layers 106a-n within the AI model 104 can incorporate relevant data sources, algorithms, and/or analytical techniques tailored to the specific context the particular addresses. The layers 106a-n can identify patterns and/or generate predictions or recommendations that contribute to the overall decision-making process of the AI model 104. In some implementations, layers 106a-n are augmented with additional capabilities such as machine learning (ML) models, natural language processing (NPL) algorithms, or domain-specific heuristics to enhance their effectiveness. Layers 106a-n can evolve over time in response to changing regulations or guidelines, emerging trends, or new insights identified by the AI model. Layers 106a-n within the AI model can also be versioned to accommodate evolving requirements and regulations. For instance, layers 106a-n tailored towards privacy regulations that apply in 1124 may differ significantly from those anticipated for 1130. By versioning layers 106a-n, the system can maintain and apply distinct sets of rules and guidelines that correspond to different regulatory frameworks over time.

The layers 106a-n within the AI model can include the overall layer's 108a-n function, as well as metrics on the logic used within the layers 106a-n (e.g., layer-specific model logic), such as weights, biases, and activation functions, that affects how the model processes information and arrives at its conclusions. Weights determine the importance of each input, biases adjust the output along certain dimensions, and activation functions control the signal propagation through the network. Further methods of using layers 106a-n to generate responses for the AI model 104 and modifying layers are discussed with reference to FIG. 2.

Example layers include, but are not limited to, demographics current financial data (e.g., credit score), financial history, market conditions corporate strategy (e.g., tactical, strategic), geopolitical and systemic implications (e.g., tactical, strategic), corporate conditions, complexity of financial product, loss risk of the product, length of investment, buyout options, complexity of transaction, financial data and history of social graph, employment history, product applicability, operational and/or execution costs, and/or regulatory guidelines (e.g., regional, global).

For example, in a cybersecurity context, one layer can focus on network traffic analysis, and employ algorithms and techniques to identify anomalous patterns within network traffic that are indicative of potential cyber threats or malicious activities. A different layer can focus on regulatory compliance by ensuring that the AI model complies with cybersecurity jurisdictional and/or organizational regulations, such as regulations directed towards data privacy. In another example, in a financial context, one layer can focus on data quality, another layer can focus on financial regulatory compliance, a third layer can focus on identifying bias, a fourth layer can be focused on uncertainty, and so on.

Layers 106a-n and their functions within the AI model can be versioned and stored along with metadata to enable reusability of the layers 106a-n and facilitate performance comparisons between the versioned layers. Each versioned layer can include metadata that captures the specific configurations, such as weights, biases, activation functions, and the regulatory or contextual parameters the versioned layer addressed. This approach enables the layers 106a-n to be reused across different models and applications.

As the command set 102 is processed through the AI model 104, the command set 102 traverses through each layer 106a-n sequentially, with each layer 106a-n constructing layer-specific model logic (which can be non-uniform) to generate layer-specific responses. For example, one layer can use signature-based detection methods to identify known malware threats, while another layer can use anomaly detection algorithms to detect suspicious behavior indicative of potential cyber-attacks. Layer-specific responses generated by each layer can provide actionable insights specific to a particular layer to enhance cybersecurity posture and/or resilience. Examples of using layer-specific model logic to generate layer-specific responses are discussed in further detail with reference to FIG. 2.

In some implementations, the layer-specific responses can include alerts, notifications, risk assessments, and/or recommended mitigation strategies tailored to the specific context addressed by each layer. For example, a layer specializing in network traffic analysis can generate a response highlighting anomalous patterns indicative of a potential distributed denial-of-service (DDOS) attack, along with recommendations for implementing traffic filtering measures or deploying intrusion prevention systems (IPS) to mitigate the threat.

The layer-specific responses from all layers 106a-n are aggregated to produce an overall response 108. The overall response 108 includes the collective decisions generated by the AI model, synthesized from the individual contributions of each layer 106a-n. The overall response provides a holistic perspective of the layers 106a-n on the command set 102. Methods of aggregating the layer-specific responses from all layers 106a-n are discussed in further detail with reference to FIG. 2.

Figure 2:
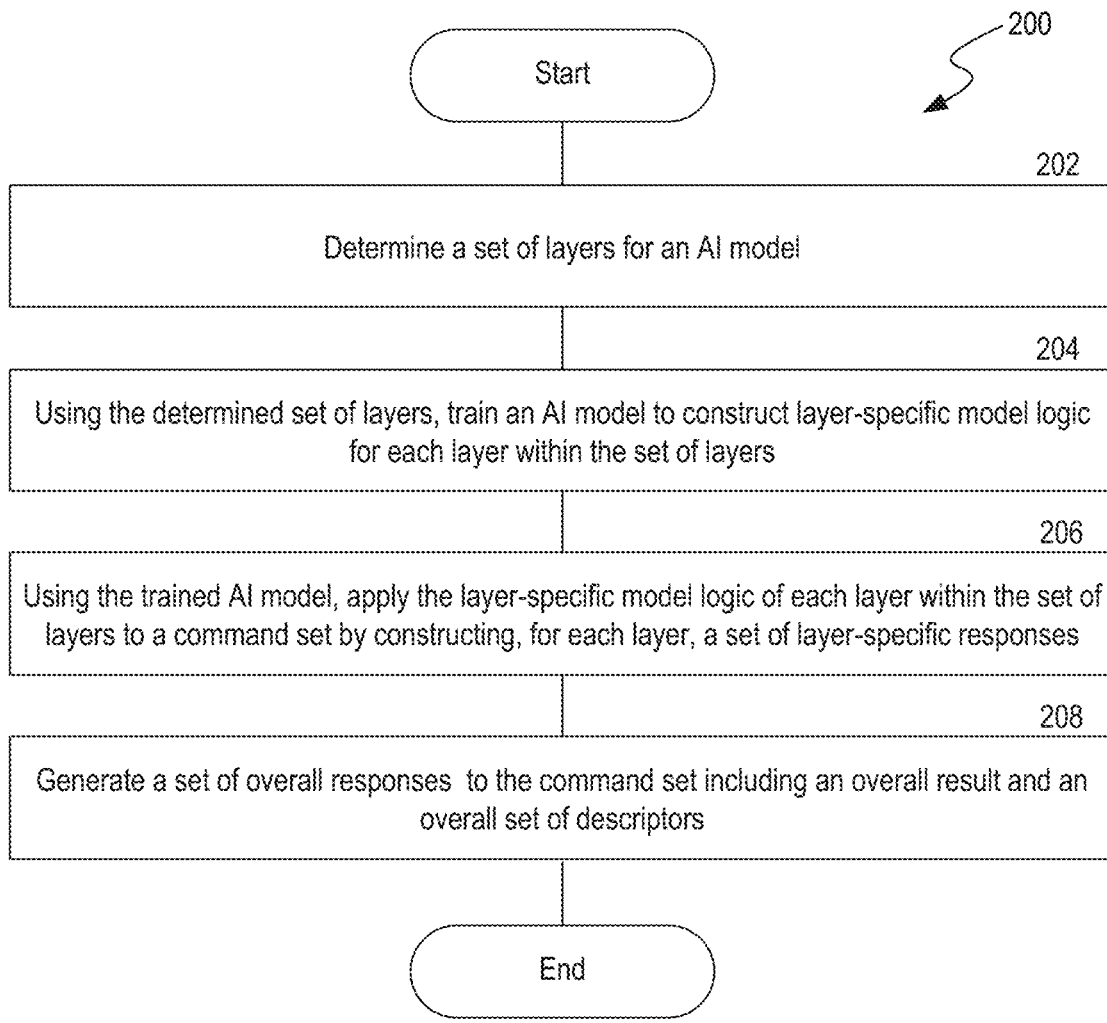
FIG. 2 is a flow diagram illustrating a process of constructing a layered AI model, in accordance with some implementations of the present technology.

FIG. 2 is a flow diagram illustrating a process 200 of constructing a layered AI model, in accordance with some implementations of the present technology. In some implementations, the process 200 is performed by components of example computer system 1300 illustrated and described in more detail with reference to FIG. 13. Particular entities, for example, AI model 104, are illustrated and described in more detail with reference to FIG. 1. Likewise, implementations can include different and/or additional steps or can perform the steps in different orders.

At act 202, the system determines a set of layers for an AI model. Each layer within the set of layers relates to a specific context associated with the AI model (e.g., cybersecurity, finance, healthcare). The layers are the same as or similar to layers 106a-n illustrated and described with reference to FIG. 1.

Contexts within each layer of the AI model can be stored as vectors (e.g., described further with reference to FIG. 4) and/or structured data, to allow the layers to be reused and easily explained. Each layer's context can include metadata detailing its purpose, including a date/time stamp, version number, and other relevant information. This metadata allows for transparency and traceability, facilitating easier audits and updates. Additionally, the context can store necessary data elements, such as Shapley values, used by the system to understand the contributions of different inputs to the layer's decisions. The context can also include the layer's mathematical functions, such as weights, biases, and activation functions, to provide an indicator of the layer-specific model logic employed. In some implementations, the context associated with the AI model is the combined contexts of these individual layers processed through a mathematical function.

In some implementations, contexts can be derived from various sources such as the Common Vulnerabilities and Exposures (CVE) database (in the context of cybersecurity), inputted data, a knowledge base, and structured data formats. Additionally, historical data such as data on previous attacks (in the context of cybersecurity), and stored contexts from earlier analyses can be used to determine the context of an AI model. Contexts can also be retrieved using vector grouping, which allows for the clustering and identifying relevant patterns and relationships within the data used in the AI model. Vector grouping, also known as clustering, aims to group similar data points based on their proximity or similarity in the multidimensional space. By clustering data points that share common characteristics or exhibit similar patterns, vector grouping helps identify meaningful relationships and patterns within the data and enables the AI model to recognize distinct contexts or themes present in the data. For example, vector grouping could identify clusters of data points representing different types of cyber threats, attack vectors, or user behaviors and infer that cybersecurity is a context for the AI model.

Each layer within the set of layers includes a set of variables associated with the specific context of the corresponding layer. Each variable represents an attribute identified within the specific context of the corresponding layer. Variables can take various forms depending on the nature of the data and the objectives of the AI model. For example, variables can represent numerical values, categorical attributes, textual information, and/or data structures. In a predictive modeling task, variables can include demographic attributes such as age, gender, and income level, as well as behavioral attributes such as purchasing history and online activity. In a natural language processing (NLP) task, variables can include words, phrases, or sentences extracted from text data, along with associated linguistic features such as part-of-speech tags and sentiment scores. For example, in a layer whose domain context relates to analyzing anomalies in network traffic, variables can include source IP address, destination IP address, packet size, and/or port number.

In some implementations, variables can be text, image, audio, video and/or other computer-ingestible format. For variables that are not text (e.g., image, audio, and/or video), the variables can first be transformed into a universal format such as text prior to processing. Optical character recognition (OCR) can be used for images containing text, and speech-to-text algorithms can be used for audio inputs. The text can then be analyzed and structured into variables for the corresponding layer(s) of the AI model to use. In some implementations, in cases where transforming to text is not feasible or desirable, the system can use vector comparisons to handle non-text variables directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file).

Furthermore, the layers and/or variables within the layers can be tailored specifically to the domain of the AI model, or be used universally. For example, tailored layers in a cybersecurity AI model can include network traffic anomalies, user authentication, and threat intelligence, each providing insights into potential security threats and vulnerabilities. Alternatively, universal layers that can be applied to AI models regardless of the AI model's context could be used to analyze bias and data quality.

In some implementations, the set of layers is determined by a received input (e.g., through an interface by a user). The received input can indicate the specific contexts associated with the AI model. In some implementations, the set of layers and/or variables are dynamically determined by an ML model. The ML model can identify the specific contexts associated with the AI model. Layers and/or variables within AI models can include features generated through data transformation or feature engineering techniques. The derived layers and/or variables can capture relationships or patterns within the data that are not directly observable in the raw input or structured metadata of the input. For example, the ML model can receive the AI model's input training data. Using the gathered data, the ML model captures relationships or patterns within the data, and flags the relationships or patterns as potential layers or variables. Clustering algorithms can be applied to identify patterns and distinct subgroups (e.g., contexts) within the dataset. Further methods of training an ML model are discussed in further detail with reference to FIG. 13.

For example, the ML model analyzes the data to and identifies a context of the AI model to be overall related to customer satisfaction by recognizing the data to indicate the level of satisfaction, and further identifies potential layers to determine customer satisfaction, such as sentiment polarity, intensity, or topic relevance. The ML model can additionally determine variables for corresponding layers by identifying frequent words or phrases associated with positive or negative sentiments, as well as syntactic structures that convey sentiment.

In some implementations, the system receives an indicator of a type of application associated with the AI model. This indicator serves as a signal or cue that informs the system about the specific domain or context in which the AI model will be deployed. The indicator can take various forms, such as a user-defined parameter, a metadata tag, or a configuration setting, depending on the implementation. Upon receiving the indicator, the system proceeds to identify a relevant set of layers associated with the type of application defining one or more operation boundaries of the AI model. For example, the system can map the indicator to a predefined set of layers that are relevant in addressing the requirements and objectives of the identified application type. The identification process can be based on predefined mappings or rules.

In some implementations, instead of relying on automated mapping or inference based on the application type indicator, users can manually select and specify the desired layers for the AI model. This manual configuration process provides users with greater flexibility and control over the composition and customization of the AI model, allowing them to tailor it to their specific preferences. Once identified, the system can obtain the relevant set of layers, via an Application Programming Interface (API).

In some implementations, the system receives an input containing an overall set of layers and an overall set of variables for each layer. Using an ML model, the system compares the specific contexts within the overall set of layers with the specific contexts related to the AI model. The system extracts the AI model-specific set of layers from the overall set of layers using the comparison. For example, an ML algorithm can evaluate historical data, user feedback, or performance metrics to identify and adapt the set of layers based on observed patterns or trends. Relevant features or attributes can be extracted from the AI model's input data to capture patterns or signals indicative of the effectiveness of different layers. Feature extraction techniques can include statistical analysis, dimensionality reduction, or domain-specific methods tailored to the characteristics of the data. ML models used in determining the relevant layers and variables using the overall set of layers and variables can include supervised learning models, unsupervised learning models, semi-supervised learning models, and/or reinforcement learning models. Examples of machine learning models suitable for use with the present technology are discussed in further detail with reference to FIG. 3.

If the ML model is provided with labeled data as the training data and given an overall context (e.g., cybersecurity), the ML model can, in some implementations, filter the attributes within the training data of the AI model and identify the most informative attributes (e.g., certain patterns). For example, attributes such as time stamps and user IDs may be more informative in the cybersecurity context than attributes such as pet ownership status. Correlation, mutual information, and/or significance tests can be used to rank the attributes based on the discriminatory power. Correlation analysis measures the strength and direction of the linear relationship between each attribute and the target variable (in this case, the presence of a layer). Attributes with higher correlation coefficients are considered more relevant for detecting a layer. For example, a correlation coefficient of +1 or greater indicates a strong positive linear relationship. Mutual information estimation quantifies the amount of information shared between each attribute and the target variable, identifying attributes with higher mutual information as more informative for layer detection. Once the attributes are ranked based on discriminatory power, the system selects only the most informative features to reduce the dimensionality of the dataset. By selecting only the most informative features, filter methods help reduce the dimensionality of the dataset (e.g., by only including layers and variables that are determinative of the AI model's prediction), leading to faster processing times and improved model performance.

If the ML model is provided with unlabeled data, the ML model can use unsupervised learning techniques to identify patterns and structures within the training data. For example, clustering algorithms, which group similar instances based on shared characteristics, can be used to identify clusters of text passages that exhibit similar patterns of a potential layer. Clustering algorithms such as k-means or hierarchical clustering can be applied to the unlabeled text data to group instances that share common attributes or features. The algorithms partition the data into clusters such that instances within the same cluster are more similar to each other than to instances in other clusters. By examining the contents of each cluster, the ML model can identify patterns indicative of a domain context, such as the frequent occurrence of certain words or phrases. Additionally, topic modeling, which identifies underlying themes or topics present in the text data can be used by the ML model to automatically identify topics within a corpus of text documents (e.g., if the regulations or guidelines that the AI model is subject to are given as a corpus of text documents). Each topic represents a distribution over words, and the data is assumed to be generated from a mixture of the topics. By analyzing the topics inferred from the unlabeled data, the ML model can gain insights into the underlying themes or subjects that can be associated with a particular domain context.

For example, one or more of the layers within the set of layers can relate to the quality of input data. The corresponding set of variables can be defined to capture relevant attributes or features associated with the quality of input data. These variables serve as indicators or metrics that inform the AI model about the characteristics of the input data and its suitability for analysis. Examples of quality-related variables can include the author associated with the input data, the timestamp indicating when the data was collected or modified, the location from which the data originated, the presence or absence of structured metadata, and/or the presence of outliers or anomalies in the data distribution. In some implementations, the system establishes criteria or thresholds for identifying outliers or anomalies through predetermined rules. For example, in a dataset input to the AI model that includes a series of temperature readings collected from various weather stations over a period of time, if most of the temperature readings fall within a range of 15 to 25 degrees Celsius, a reading of 50 degrees Celsius, which is significantly higher than the usual range, can be considered an outlier because the data deviates substantially from the expected pattern of temperature readings in the dataset. In another example, if entries in the input dataset are consistently missing metadata, the data quality layer can identify and flag the instances and, for example, return an output stating that the user should provide a better quality dataset, or that the output given has a low confidence score due to the poor quality of the dataset.

In a further example, one or more of the layers within the set of layers can relate to attempts to access data. These layers analyze access events and identify patterns or anomalies indicative of potential security breaches or unauthorized access attempts. For example, a layer can focus on analyzing login attempts to a system or application, while another layer can monitor API calls or file access events. Examples of access-related variables can include the author associated with the access attempt (e.g., user ID or IP address), the timestamp indicating when the attempt occurred, the location from which the attempt originated, the presence of authorization or permissions granted for the attempt, information about previous unsuccessful attempts, and/or the frequency of access attempts over a specific time period.

In some implementations, the AI model can be constructed to identify new layer(s) within the command set. For example, ML algorithms can be applied to analyze historical command data and identify recurring themes or topics that warrant the creation of new layers. The ML algorithms can use clustering or topic modeling to identify recurring themes or patterns within the command data. For example, the ML algorithms can detect frequent commands related to user authentication, data access, or system configuration changes. The system can iteratively update the set of layers by adding the new layer(s) to the set of layers. For instance, if the ML algorithm reveals a pattern of commands related to user access control, the system can create a new layer dedicated to user authentication and authorization processes.

In act 204, using the determined set of layers, the system trains an AI model to construct layer-specific model logic for each layer within the set of layers. The layer-specific model logic generates, in response to an input, a layer-specific result using the corresponding set of variables of the layer. In some implementations, each layer-specific model logic is constructed by training the AI model on a master dataset, which includes the corresponding set of variables of each layer. For example, the layer-specific model logic can be an algebraic equation that aggregates the variables within the layer to generate a layer-specific response (e.g., "Variable_1+2 (Variable_2)+0.5 (Variable_3)=Layer-Specific_Response").

In some implementations, to construct the layer-specific model logic for each layer, the system can transform the layers of AI model using a rule-based engine. For example, the system can project/map the layers and/or variables of the AI model onto parameters that can operate within an AI model. Each layer-specific model logic in an AI model performs specific computations that contribute to the overall decision-making process. The rule-based engine maps each layer to a particular set of computations. For example, the rule-based engine can map a layer's task of identifying part-of-speech tags in text to specific neural network weights that are responsible for recognizing syntactic patterns. Similarly, a layer focused on sentiment analysis can be mapped to parameters that detect positive or negative word usage based on historical data.

In some implementations, the training data is labeled data. For example, a labeled dataset for detecting unauthorized attempts can include words or phrases labeled as either "authorized" or "non-authorized" based on whether a user was unauthorized. In some implementations, the training data is unlabeled data. Unlabeled data lacks explicit annotations and requires the model to infer patterns and structures independently. For example, unlabeled data can include the metadata associated with the attempt (e.g., timestamps, author), but without explicit annotations indicating which attempts are authorized or unauthorized.

For data privacy reasons, synthetic data can be generated and used as the training dataset for different layers within the layered AI model, either as a master dataset that all the layers are trained on, or the dataset that one or more layers are trained on. Generative adversarial networks (GANs), which consist of two neural networks—a generator and a discriminator—can be trained iteratively to generate realistic-looking data samples. For example, the generator network creates synthetic data samples from random noise or latent vectors. The generated samples are fed into the discriminator network, along with real data samples from the training dataset. The discriminator distinguishes between real and synthetic data samples. As the training progresses, both networks (the generator and the discriminator) engage in a competitive process where the generator aims to produce increasingly realistic samples, while the discriminator becomes more adept at distinguishing between real and synthetic data. Through the iterative process, the generator network learns to generate synthetic data that closely matches the statistical properties and distribution of the real data. This enables the creation of synthetic data samples that exhibit similar patterns, features, and characteristics as the original dataset, without directly exposing sensitive information or violating privacy constraints. The system constructs one or more layer-specific model logics of the AI model using the synthetic data.

In some implementations, the layer-specific model logic constructed by the AI model is generated based on a complexity of the set of variables derived from the specific context of the layer. Complexity can be determined by various factors, such as the number of distinct values, the range of possible values, or the degree of uncertainty associated with the variable. For example, a variable representing the presence of a specific threat indicator can be considered less complex than a variable representing the statistical distribution of network traffic patterns. The AI model analyzes the set of variables within each layer to determine their relative complexity. After determining the complexity of the layer, the layer-specific model logic evaluates each variable in sequence. For example, subsequently used variables in the layer-specific model logic can be progressively more complex than preceding variables. This way, the AI model can prioritize simpler variables before evaluating more complex variables to conserve computing resources. For example, if a threshold condition needed to evaluate more complex variables are not met, the layer-specific model logic does not need to evaluate the more complex variables since those variables would not be determinative of the layer-specific outcome.

In some implementations, the number of layers used in constructing the AI model is determined based on computational complexity, which is associated with time (e.g., sequence length, dimensionality) and space (e.g., number of parameters, memory required, number of layers). Sequence length refers to the length of input or output sequences processed by the AI model. Longer sequences require more computation, as each token or word in the sequence must be processed and contextualized within the entire sequence. A longer sequence can increase the complexity of computation due to the longer time required for training and inference. Dimensionality refers to the size of the input and output vectors, representing the data processed by the AI model. Higher dimensionality means each data point is represented with more features, increasing the complexity of the computations the AI model performs. The number of parameters refers to the total count of weights and biases in the model, which impacts the model's ability to learn and generalize from data. Greater parameters can mean more complex and potentially more accurate models, but greater parameters also require increased memory and computational resources to manage. Memory required includes the amount of RAM or other memory resources needed to store the model parameters and intermediate computation results during training and inference. As the AI model size grows, so does the memory requirement, which can be a limiting factor in deploying large models on hardware with limited resources.

The number of layers in an AI model affects both time and space complexity. Each layer adds additional computation and storage requirements, as the data must pass through multiple transformations and computations from input to output. More layers generally allow the model to capture more complex patterns and dependencies in the data, but more layers also increase the overall computational load and memory usage.

In act 206, using the trained AI model, the system applies the layer-specific model logic of each layer within the set of layers on a command set. The system passes the command set (e.g., command set 102) through the AI model, where each layer processes the command set independently using the layer's specific set of variables and learned parameters. The layer-specific model logic determines how the AI model interprets and responds to the command set within the context of each layer.

In some implementations, the output of one layer can operate as an input for subsequent layers to allow the AI model to leverage the insights and decisions generated at each layer to inform subsequent steps. For example, one layer can focus on data quality and output flagged instances of unusual activity (e.g., anomalous timestamp or location), and the system can pass the output to a subsequent layer directed to anomaly detection. The flagged instances from the data quality layer can be input into the anomaly detection layer, where more complex algorithms can be used to further evaluate the flagged data points in greater detail to search for deviations from normal behavior that may signify a security threat. The output of this layer may consist of, for example, risk scores assigned to each flagged instance, providing a deeper level of insight into potential security breaches.

The system generates, for each layer, a set of layer-specific responses that can include (1) the layer-specific result in accordance with the application of the layer-specific model logic of each layer within the set of layers, and/or (2) a layer-specific set of descriptors indicating the corresponding layer-specific model logic to generate the layer-specific result. The layer-specific result represents the output or prediction generated by the AI model within the domain or context defined by the specific layer. The layer-specific set of descriptors provides transparency and interpretability in the decision-making process of the AI model. The layer-specific descriptors can include information about the variables, algorithms, or methodologies employed within each layer to arrive at the layer-specific result. For example, in the context of a command set aimed at determining whether an access attempt was authorized, the layer-specific result can be "non-authorized." Correspondingly, the layer-specific set of descriptors can be "incorrect password," which explains why the user was classified as non-authorized. In some implementations, in response to reaching a non-compliance threshold, the system is prevented from generating additional sets of layer-specific responses.

In act 208, the system generates a set of overall responses to the command set including an overall result and an overall set of descriptors. The overall result for each layer can include a binary indicator of one or more variables in corresponding set of variables, a category of the layer-specific response, and/or a probability of the layer-specific response. The overall set of descriptors is associated with a series of the layer-specific set of descriptors to generate the overall result. The overall set of descriptors can indicate the set of layers, the corresponding sets of variables, and/or the weights used for each layer.

To generate the overall result, the system aggregates the layer-specific results from each layer using weights for each layer. In some implementations, the weights are manually defined and predetermined by users. In some implementations, the system uses ML algorithms to determine the weights for each layer. For example, the system can analyze historical data to identify the most effective weightings that maximize the accuracy or reliability of the AI model's predictions. The system can use techniques such as gradient descent, genetic algorithms, or Bayesian optimization to search for the most effective weightings. Gradient descent iteratively adjusts the weights of the layers to minimize a loss function, which measures the difference between the predicted outputs and the actual targets in the training data. By computing the gradient of the loss function with respect to the weights, gradient descent determines the direction and magnitude of weight updates that reduce the loss, gradually converging towards a more effective set of weights. Additionally, Bayesian optimization iteratively selects candidate points in the weight space to evaluate, and balances exploration (searching for promising regions) and exploitation (exploiting regions with high predicted performance). Through this process, Bayesian optimization efficiently converges towards the optimal set of weights by sampling the weight space.

In some implementations, the weights can be determined through confidence scores of each layer-specific response. The system generates confidence scores, via the AI model, for the corresponding layer-specific response. The confidence scores represent a reliability of the layer-specific response, and the system dynamically switches between one or more layers within the set of layers based on the generated confidence scores. For example, layers with higher confidence scores in its layer-specific response are weighted more than layers with lower confidence scores in its layer-specific response.

Once the layer-specific results and their corresponding weights are determined, the system proceeds to aggregate the layer-specific results into an overall result to the command set. The aggregation process can involve mathematical operations such as weighted averaging, summation, or techniques tailored to the specific requirements of the AI model and its application domain. For example, a mathematical function aggregating the layer-specific results can include the layer's bias, weights for particular layer-specific results, and/or other functions used by the layers for the layer-specific results.

Using the generated overall result, the system aggregates the layer-specific set of descriptors that are associated with the set(s) of descriptors used to generate the overall result. In some implementations, only the sets of descriptors that support this overall result are included in the overall set of descriptors. For example, if the overall result is binary (e.g., "AUTHORIZED"), only the descriptors for the layers which support this result (e.g., non-suspicious frequency or location) are included in the overall set of descriptors. Alternatively, all of the sets of descriptors for all of the layers used in the prediction are included in the overall set of descriptors.

Based on the aggregation, the system generates a set of overall responses to the command set including an overall result and an overall set of descriptors. The overall set of descriptors is associated with a series of the layer-specific set of descriptors to generate the overall result. The overall set of descriptors can indicate the set of layers, the corresponding sets of variables, and/or the predetermined weights used for each layer. The overall result for each layer can include a binary indicator of one or more variables in corresponding set of variables, a category of the layer-specific response, and/or a probability of the layer-specific response.

In some implementations, the system uses the overall responses, to generate a set of actions (e.g., recommendations, corrective actions) to adjust the overall result to a desired result. The actions aim to address any identified issues or deficiencies. For example, if certain layers fail to meet the desired criteria due to specific attribute values or patterns, the actions can suggest adjustments to those attributes or modifications to the underlying processes. For example, a suggested action can be to weigh certain layers differently if new regulations or guidelines are given to the AI model.

The system can use an ML model to learn from historical data and past decisions to identify patterns and trends that indicate a set of actions the AI model can take to comply with the adjust the overall result to the desired result. By training on a dataset of past corrective actions and the outcomes, the machine learning models can predict the most effective recommendations for new cases. The set of actions can be automatically implemented as corrective actions by the system. For example, the system can receive user feedback related to deviations between the overall response of the AI model and desired response (e.g., feedback to stop using a certain layer/variable, or to add a new layer/variable). The system can iteratively adjust the set of layers and/or the layer-specific model logic to modify the overall response to the desired response. In some implementations, the system can tag relevant recommendations with attributes that help contextualize the relevant recommendations. The tags serve as markers that categorize and organize the recommendations based on predefined criteria, such as regulatory compliance and cybersecurity. The tags provide a structured representation of the recommendations and allow for easier retrieval, manipulation, and analysis of future command sets. The tags and associated metadata can be stored in a structured format, such as a database, where each recommendation is linked to the recommendation's corresponding tags.

For example, to construct a layered AI model, the system can first assess both the current and target requirements or guidelines (e.g., jurisdictional, organizational, AI-type specific). In a cybersecurity context, the system can identify existing cybersecurity protocols, frameworks, and technologies in use, alongside defining the desired cybersecurity posture aligned with organizational goals, regulatory standards, and industry best practices. The system can identify any gaps or deficiencies between the current and target requirements or guidelines. For example, in a cybersecurity context, gaps can encompass areas such as network security, data protection measures, access controls, and/or incident response protocols. Once the system understands the gaps, the system can prioritize the layers used within the AI model (e.g., by adjusting the weights of particular layers, by omitting or including certain layers). For example, layers can be ranked using mathematical functions based on their relevance to the organization's mission, legal and regulatory requirements, and/or risk management expectations. Moreover, the system can continuously monitor and track progress toward addressing the identified gaps to adjust the layers (e.g., by adjusting the weights of particular layers, by omitting or including certain layers) to reduce the identified gaps. For example, a mathematical function ranking the layers can include the bias for the layer, weights for particular layers, and other functions used by the layered AI model for the layer.

In some implementations, the gap can be identified using a machine learning model trained on labeled training data to learn patterns and relationships between features and guideline sources. For example, the labeled training data can be sets of guidelines based on the type of guideline they belong to (e.g., current guideline, target guideline). Using the trained model, the system can use the trained model to identify differences between the sets of guidelines by analyzing the features that contribute most to the classification decision (e.g., current guideline, target guideline) of each set of guidelines and identifying areas of divergence or overlap between the guidelines.

In some implementations, the system presents, via an interface (e.g., a graphical user interface (GUI)), human-readable summaries and/or detailed technical reports associated with the layered AI model. For example, the human-readable summaries can use AI-generated boilerplate text to indicate which layers and variables most significantly influenced the overall outcome to provide clear and concise explanations suitable for non-technical stakeholders. On the other hand, the detailed technical reports can include formulas and computational steps used in constructing the layered AI model, or a subset thereof if desired to offer in-depth insights into the model's workings for individuals such as technical users who desire a comprehensive understanding of the AI model's decision-making process.

Figure 3:
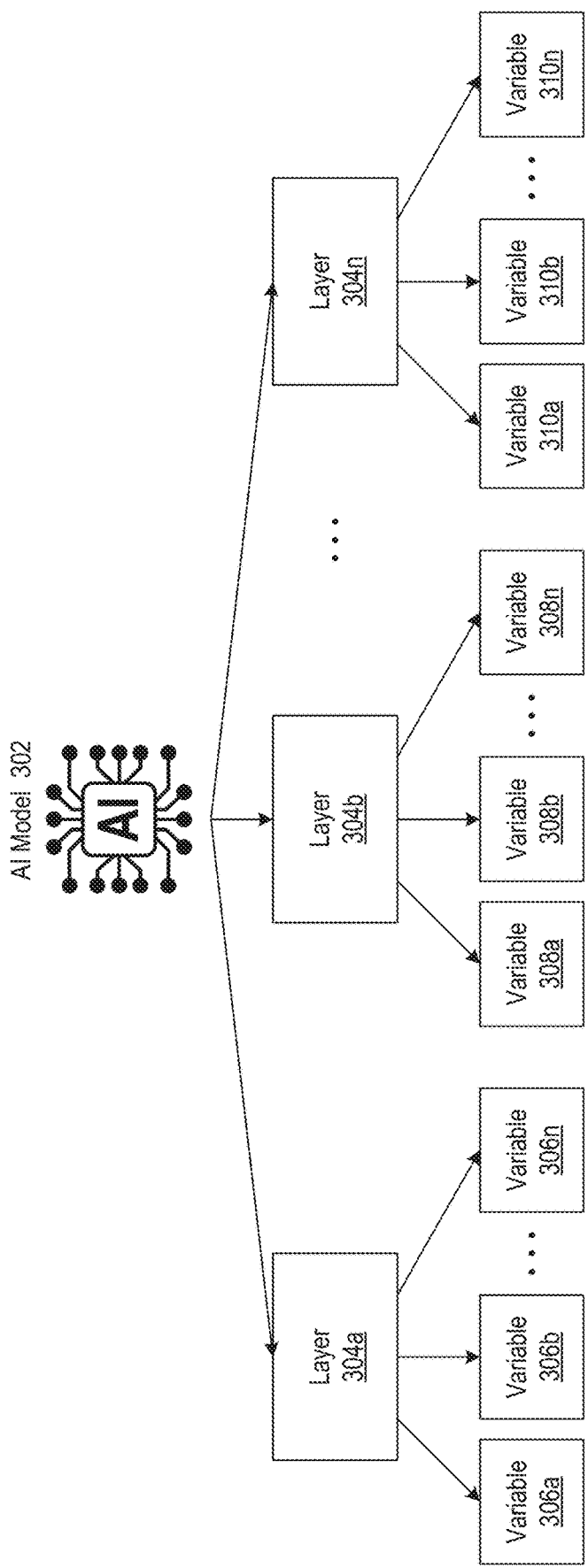
FIG. 3 is an illustrative diagram illustrating an example environment of variables within the layers of an AI model.

FIG. 3 is an illustrative diagram illustrating an example environment 300 of variables within the layers of an AI model. Environment 300 includes AI model 302, layers 304$a$-$n$, and variables 306$a$-$n$, 308$a$-$n$, 310$a$-$n$ for each layer 304$a$-$n$. AI model 302 is the same as or similar to AI model 104 illustrated and described in more detail with reference to FIGS. 1, respectively. Layers 304$a$-$n$ are the same as or similar to layers 306$a$-$n$ illustrated and described in more detail with reference to FIG. 1. AI model 302 is implemented using components of example computer system 1300 illustrated and described in more detail with reference to FIG. 13. Likewise, implementations of example environment 300 can include different and/or additional components or can be connected in different ways.

Within each layer 304$a$-$n$, a set of variables 306$a$-$n$, 308$a$-$n$, 310$a$-$n$ are defined to capture the key attributes and features associated with the respective domain of the corresponding layer 304$a$-$n$. For example, variables 306$a$-$n$ correspond to layer 304$a$, variables 308$a$-$n$ correspond to layer 304$b$, and variables 310$a$-$n$ correspond to layer 304$c$. Each variable represents a parameter that contributes to the layer's analysis and decision-making process (e.g., layer-specific model logic). The variables 306$a$-$n$, 308$a$-$n$, 310$a$-$n$ within each layer 304$a$-$n$ can be organized and structured according to the variables' 306$a$-$n$, 308$a$-$n$, 310$a$-$n$ relevance and importance to the corresponding layer's specific objectives. For example, variables associated with demographic information can include age, gender, and income level, while variables related to financial data can encompass account balances, transaction history, and credit scores.

Machine learning techniques can be applied to identify patterns or clusters within the layers and automatically categorize the layers into relevant variables based on similarity or relevance. Clustering algorithms, such as k-means or hierarchical clustering, can be used to identify variables based on the layer's content or features by partitioning the data underlying the layer into clusters, where the content within each cluster is more similar to each other than the content in different clusters. After clustering the content within layer, the system can assign each cluster to a relevant variable based on the cluster's content or theme. For example, if a cluster predominantly discusses gender, the cluster is assigned to a variable related to gender. Further methods of identifying variables within a layer are discussed with reference to FIG. 2.

In some implementations, deep learning techniques (e.g., recurrent neural networks (RNNs)) are used to learn latent representations of the layer and automatically cluster the layer based on learned representations. In some implementations, ensemble learning techniques, such as Random Forests or Gradient Boosting Machines (GBMs), are used to combine multiple clustering algorithms or models to improve the accuracy of the clustering process by aggregating the predictions of multiple base models to produce a final clustering solution, which can be more reliable than individual models alone.

Figure 4:
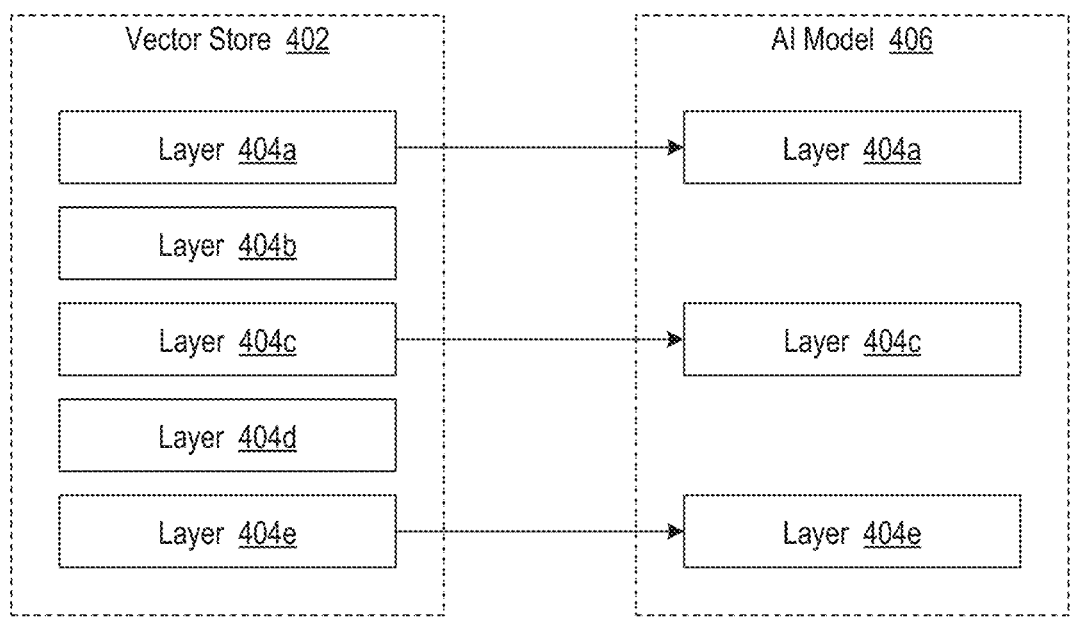
FIG. 4 is an illustrative diagram illustrating an example environment for constructing a layered AI model with layers from a vector store.

FIG. 4 is an illustrative diagram illustrating an example environment 400 for constructing a layered AI model with layers from a vector store. Environment 400 includes vector store 402, layers 404a-n within vector store 402, and AI model 406. AI model 406 is the same as or similar to AI model 104 and AI model 302 illustrated and described in more detail with reference to FIG. 1 and FIG. 3, respectively. Layers 404a-n are the same as or similar to layers 106a-n and layers 304a-n illustrated and described in more detail with reference to FIG. 1 and FIG. 3, respectively. AI model 406 is implemented using components of example computer system 1300 illustrated and described in more detail with reference to FIG. 13. Likewise, implementations of example environment 400 can include different and/or additional components or can be connected in different ways.

The vector store 402 is a repository for pre-existing layers that can be used in the construction of the AI model. The vector store 402 stores the layers 404a-n in a structured and accessible format (e.g., using distributed databases or NoSQL stores), which allows for efficient retrieval and utilization by the AI model 406. Contained within the vector store are multiple layers 404a-n. The layers 404a-n are stored in a structured manner within the vector store 402, with each layer 404a-n including algorithms and/or data relevant to specific domains or aspects of the decision-making process. In some implementations, only select layers from the vector store are used in the AI model 406. For example, in FIG. 4, only layers 404a, 404c, and 404e are selected to be included in the AI model 406. The AI model 406 integrates the selected layers 404a, 404c, and 404e from the vector store 402. By using layers from a vector store 402, constructing the AI model 406 becomes more streamlined, as it eliminates the need to develop or train new layers from scratch. Rather, existing layers that have been pre-designed and/or validated (e.g., adhering to regulations or guidelines) can be readily incorporated into the AI model, accelerating the development process.

In some implementations, the layers 404a-n are preprocessed to remove any irrelevant information, standardize the format, and/or organize the layers 404a-n into a structured database schema. Once the layers 404a-n are prepared, the layers 404a-n can be stored in a vector store 402 using distributed databases or NoSQL stores.

In some implementations, the layers 404a-n are stored using graph databases such as Neo4j™ or Amazon Neptune™. Graph databases represent data as nodes and edges, allowing for the modeling of relationships between layers 404a-n to demonstrate the interdependencies. In some implementations, the layers 404a-n are stored in a distributed file system such as Apache Hadoop™ or Google Cloud Storage™. These systems offer scalable storage for large volumes of data and support parallel processing and distributed computing. Layers 404a-n stored in a distributed file system can be accessed and processed by multiple nodes simultaneously, which allows for faster retrieval and analysis by the validation engine.

The vector store 402 can be stored in a cloud environment hosted by a cloud provider, or a self-hosted environment. In a cloud environment, the vector store 402 has the scalability of cloud services provided by platforms (e.g., AWS™, Azure™). Storing the vector store 402 in a cloud environment entails selecting the cloud service, provisioning resources dynamically through the provider's interface or APIs, and configuring networking components for secure communication. Cloud environments allow the vector store 402 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 402 is stored on a private web server. Deploying the vector store 402 in a self-hosted environment entails setting up the server with the necessary hardware or virtual machines, installing an operating system, and storing the vector store 402. In a self-hosted environment, organizations have full control over the vector store 402, allowing organizations to implement customized security measures and compliance policies tailored to the organization's specific needs. For example, organizations in industries with strict data privacy and security regulations, such as finance institutions, can mitigate security risks by storing the vector store 402 in a self-hosted environment.

The AI model 406 accesses layers 404a-n from the vector store 402 to initiate the compliance assessment. The AI model 406 can establish a connection to the AI model 406 using appropriate APIs or database drivers. The connection allows the AI model 406 to query the vector store 402 and retrieve the relevant layers for the AI application under evaluation. Frequently accessed layers 404a-n are stored in memory, which allows the AI model 406 to reduce latency and improve response times for compliance assessment tasks.

Layered Multi-Prompt Engineering

Figure 5:
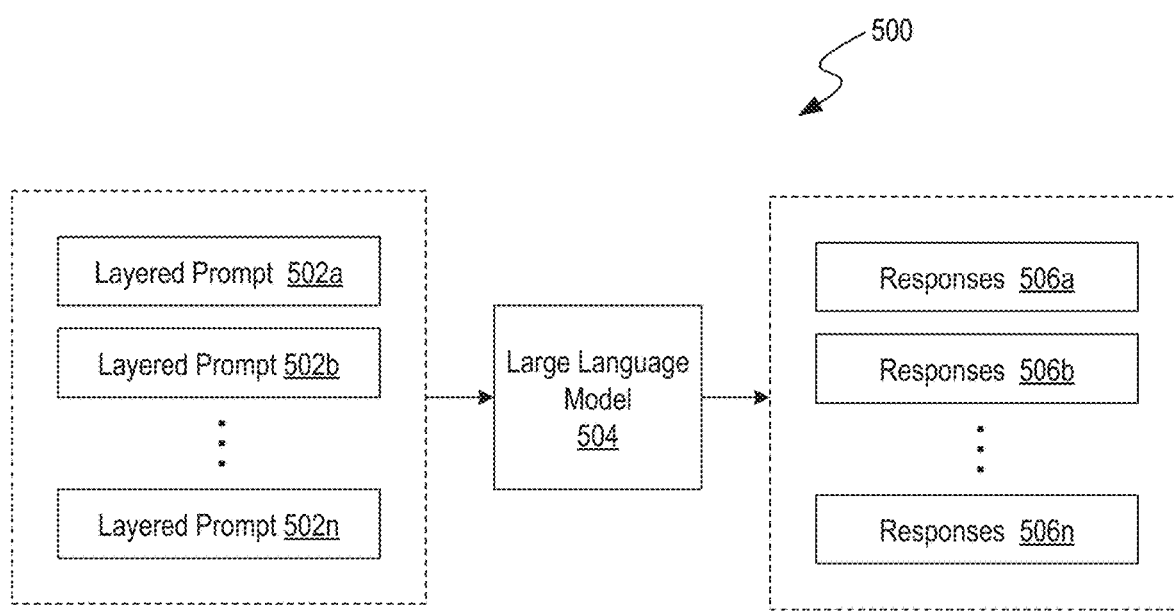
FIG. 5 is an illustrative diagram illustrating an example environment for constructing a layered AI model with layers from a vector store.

FIG. 5 is an illustrative diagram illustrating an example environment 500 of a layered prompt that operates as an input in a Large Language Model (LLM), in accordance with some implementations of the present technology. Environment 500 includes layered prompts 502a-n, LLM 504, and responses 506a-n. LLM 504 is implemented using components of example computer system 1300 illustrated and described in more detail with reference to FIG. 13.

Likewise, implementations of example environment 500 can include different and/or additional components or can be connected in different ways.

Layered prompts 502a-n represent a series of structured inputs organized into multiple layers. Layered prompts 502a-n are inputs (e.g., command set or instruction set) to an LLM, which can be natural language inputs that include instructions to the LLM to generate a desired output. In some implementations, a computer system generates layered prompts 502a-n that are provided as input to the LLM 504 via the LLM's 504 API. In some implementations, layered prompt 502a-n includes one or more examples of the desired output, which provides the LLM 504 with additional information to enable the LLM 504 to generate output according to the desired output. Additionally or alternatively, the examples included in a layered prompt 502a-n provide inputs (e.g., example inputs) corresponding to/as can be expected to result in the desired outputs provided. A one-shot prompt refers to a prompt containing a singular example, providing the LLM with a single instance of input-output correspondence for reference. In contrast, a few-shot prompt encompasses multiple examples, offering the LLM several instances of input-output pairs to learn from and generalize patterns. On the other hand, a layered prompt 502a-n that includes no examples can be referred to as a zero-shot prompt.

Each layer within each of the layered prompts 502a-n focuses on a particular context of a guideline and addresses the particular context within the decision-making process of the LLM 504. Further examples of guidelines and the particular context of the guidelines are discussed with reference to FIG. 1. Further examples of layers are discussed with reference to layers 106a-n in FIG. 1. Using layered prompts allows for a more granular and interpretable understanding of how the LLM processes inputs and arrives at the LLM's outputs. Subsequently constructed layered prompts 502a-n can be dynamically modified based on contextual conditions and the values derived from preceding layers. Methods of dynamically modifying layered prompts 502a-n are discussed in further detail with reference to FIG. 7. By dynamically modifying layered prompts, the system ensures that layered prompts 502a-n are contextually tailored and relevant to the pre-trained LLM and adapt in accordance with the evolving understanding of the pre-trained LLM's decision making processes.

LLM 504 can process layered prompts 502a-n sequentially. LLM 504 can use a neural network to perform Natural Language Processing (NLP) tasks. LLM 504 is trained to model how words relate to each other in a textual sequence, based on probabilities. In some implementations, LLM 504 contains millions or billions of learned parameters. As non-limiting examples, LLM 504 can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. LLM 504 can also be used for chatbots (e.g., virtual assistants).

For example, because GPT-type language models tend to have a large number of parameters, these language models are considered LLMs (e.g., LLM 504). An example of a GPT-type LLM is GPT-3. GPT-3 is a type of GPT language model that has been trained (in an unsupervised manner) on a large corpus derived from documents available to the public online. GPT-3 has a very large number of learned parameters (e.g., hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that GPT-3 can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

As the LLM 504 interprets each layered prompt 502a-n, the LLM 504 generates responses 506a-n that correspond to the particular phase of reasoning addressed by the respective layer of each layered prompt 502a-n. The layered approach facilitates transparency in the LLM's 504 decision-making process, as each response 506a-n can be traced back to a specific layer of each layered prompt 502a-n.

Figure 6:
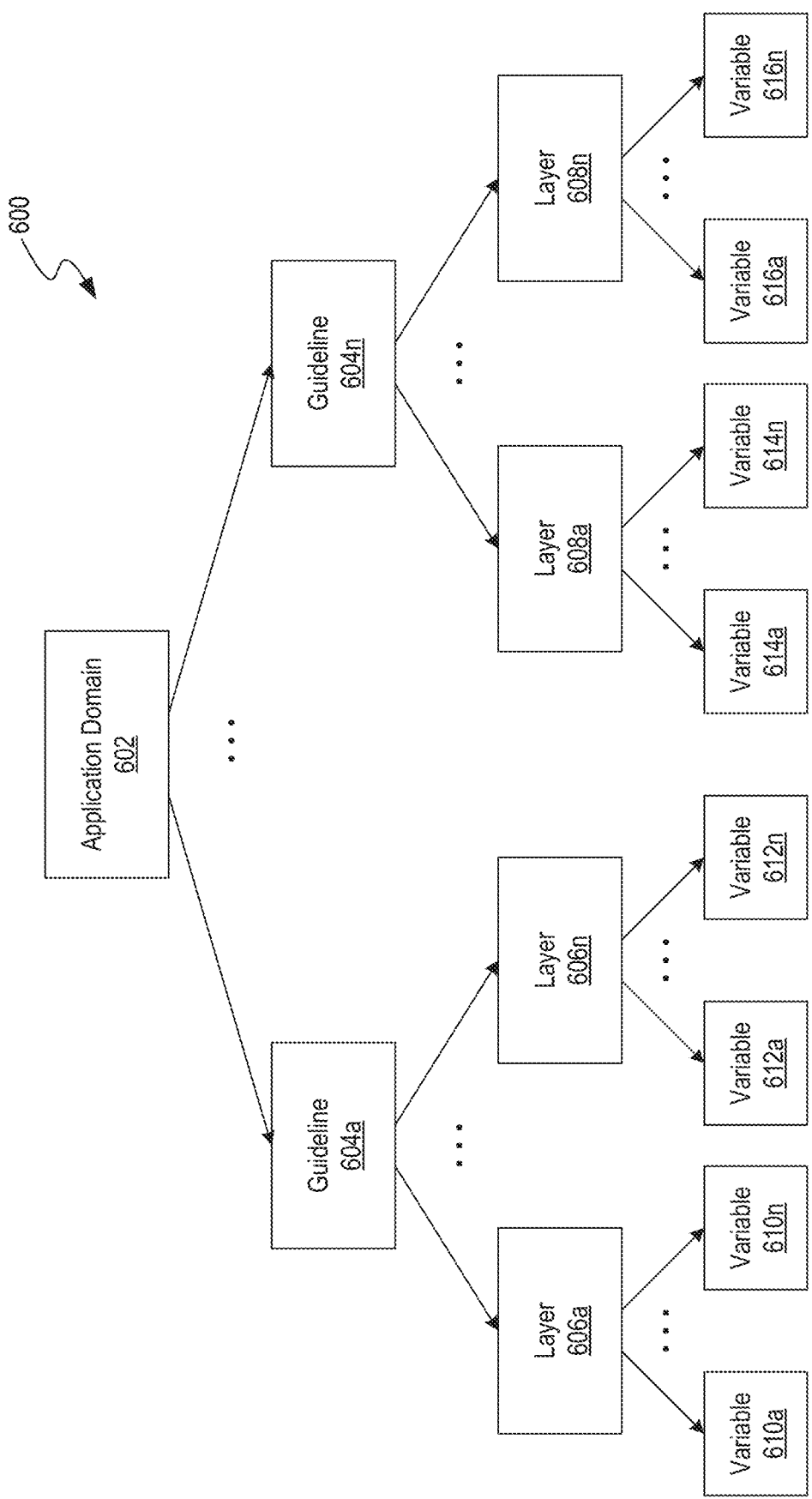
FIG. 6 is an illustrative diagram illustrating an example environment of a layered prompt that operates as an input in a Large Language Model (LLM), in accordance with some implementations of the present technology.

FIG. 6 is an illustrative diagram illustrating an example environment 600 of using an application domain of an LLM to generate layers for a layered prompt. Environment 600 includes application domain 602, guidelines 604a-n, layers 606a-n, 608a-n, and variables 610a-n, 612a-n, 614a-n, 614a-n for each layer 606a-n, 608a-n. Implementations of example environment 600 can include different and/or additional components or can be connected in different ways.

Application domain 602 is the context in which an LLM is deployed. Context is the same as or similar to the specific context associated with the AI model discussed with reference to FIG. 2. For example, the application domain can encompass various fields such as healthcare, finance, legal, or any other context in which the LLM (e.g., LLM 504 in FIG. 5) is deployed. By deriving the layered prompts in a specific application domain, the system ensures that the prompts are relevant and tailored to the nuances and requirements of the particular field (e.g., application domain 602). Using the application domain 602, relevant guidelines 604a-n are identified, which can include standards such as industry standards, best practices, and/or regulatory requirements. Guidelines 604a-n ensure that the prompt tests the LLM's satisfaction with the specific rules and constraints of guidelines 604a-n. Methods of determining relevant guidelines 604a-n are discussed in greater detail with reference to FIG. 7.

Layers 606a-n, 608a-n derived from each guideline 604a-n represent stages of reasoning, which can be sequential, within each prompt. Layers 606a-n, 608a-n are the same as or similar to layers 106a-n in FIG. 1. Each layer 606a-n, 608a-n focuses on a particular aspect of the guideline 604a-n. The hierarchical structure enables a transparent examination of how the LLM processes information from its inputs and arrives at conclusions (e.g., outputs, responses 506a-n in FIG. 5). Each guideline 604a-n can be broken down into distinct components that cover various aspects of the guideline 604a-n. For example, in a financial context, one layer can focus on data quality, another layer can focus on financial regulatory compliance, a third layer can focus on identifying bias, a fourth layer can be focused on uncertainty, and so on. In some implementations, layers 606a-n, 608a-n within the LLM can be versioned and stored along with metadata, as discussed further with reference to FIG. 1.

Layered prompts can include contextual information alongside latent variables (e.g., variables 610a-n, 612a-n, 614a-n, 614a-n). Contextual information refers to additional definitions, keywords, data points, situational cues, environmental factors, and/or scenario-specific factors that influence the LLM's decision-making process. The contextual information can include specific details about the user's query (e.g., definitions, keywords), the current context of the interaction (e.g., scenario-specific factors), historical data (e.g., data points) relevant to the task, or external conditions (e.g., environmental factors) impacting the scenario. By dynamically adjusting the layered prompts to simulate different application domains or user interactions, the system assesses how the LLM's predictions respond to varying scenarios and nuanced inputs. In some implementations, layered prompt includes clauses within the layered prompt that allow for the addition or modification of the contextual information. Rather than solely relying on predefined variables, the system, by using layered prompt, iterates towards identifying the nuanced factors that significantly influence the model's outputs.

In some implementations, by incorporating contextual information into layered prompts, the system evaluates how the LLM responds to particular elements of the decision-making process beyond the input data alone. For instance, the layered prompts can alter the contextual information to test the LLM's robustness against biases. Using scenarios involving a gender attribute as an example, if providing gender-neutral results is a requirement, the system can introduce contextual information within the layered prompt that subtly introduces bias (e.g., input data/contextual information that infers women are less qualified in a certain task). If the LLM's corresponding output changes based on the biased input (e.g., providing an output that preserves the bias from the input), the output can show that the LLM not responding to input data/contextual information properly, since providing gender-neutral results is a requirement for the LLM. Dynamically modifying the layered prompts allows evaluators to assess whether the LLM adheres strictly to the training data or if the LLM is susceptible to external influences that contradict ethical standards or regulatory requirements.

Variables $610a\text{-}n$, $612a\text{-}n$, $614a\text{-}n$, $614a\text{-}n$ are associated with each layer $606a\text{-}n$, $608a\text{-}n$, representing specific inputs or parameters that influence the prompt construction. Variables $610a\text{-}n$, $612a\text{-}n$, $614a\text{-}n$, $614a\text{-}n$ are the same as or similar to variables with reference to FIG. 2. For example, in FIG. 6, variables $610a\text{-}n$ are associated with layer $606a$. Variables $610a\text{-}n$, $612a\text{-}n$, $614a\text{-}n$, $614a\text{-}n$ can include data points, contextual information, user inputs, or other relevant factors that impact the reasoning process at each layer $606a\text{-}n$, $608a\text{-}n$. By incorporating variables $610a\text{-}n$, $612a\text{-}n$, $614a\text{-}n$, $614a\text{-}n$, the system ensures that the prompts are not only contextually relevant but also adaptable to varying scenarios and edge cases. Additional examples of variables are discussed with reference to variables $806a\text{-}n$, $808a\text{-}n$, and $810a\text{-}n$ in FIG. 8.

Figure 7:
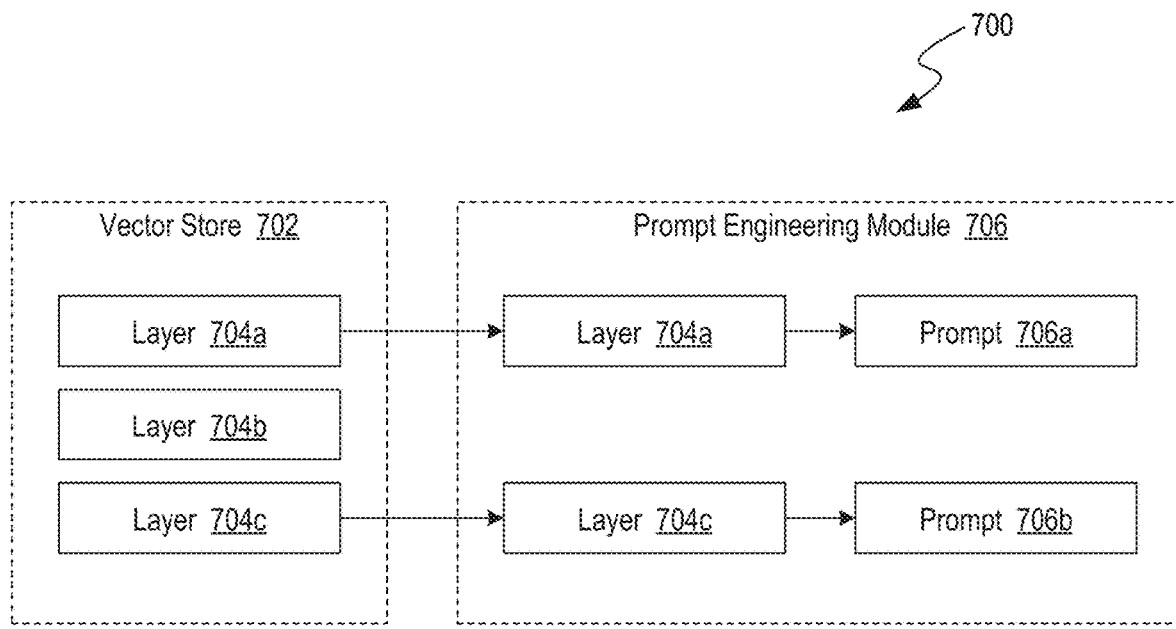
FIG. 7 is an illustrative diagram illustrating an example environment of using an application domain of an LLM to generate layers for a layered prompt.

FIG. 7 is an illustrative diagram illustrating an example environment 700 for constructing a layered prompt with layers from a vector store. Environment 700 includes vector store 702, layers 704a-c, prompt engineering module 706, and prompts 706a, 706b. Layer 704a-c is the same as or similar to layers $606a\text{-}n$, $608b$ illustrated and described in more detail with reference to FIG. 6. Prompts 706a, 706b are the same as or similar to layered prompts $502a\text{-}n$ illustrated and described in more detail with reference to FIG. 5. Prompt engineering module 706 is implemented using components of example computer system 1300 illustrated and described in more detail with reference to FIG. 13. Likewise, implementations of example environment 700 can include different and/or additional components or can be connected in different ways.

Vector store 702 is a repository for pre-processed vectors that represent different layers of prompts. These vectors can include domain-specific knowledge, guidelines, and contextual information within each layer. Vector store 702 enables efficient retrieval and assembly of relevant layers based on the specific requirements of the prompt engineering task. Vector store 702 is the same as or similar to vector store 402 illustrated and described in more detail with reference to FIG. 4. Layers 704a-c, stored within vector store 702, can be dynamically selected and retrieved from the vector store 702. For example, in FIG. 7, layer 704a and layer 704c are selected from vector store 702 to generate prompt 706a and prompt 706b respectively.

Prompt engineering module 706 is responsible for assembling the retrieved layers into coherent layered prompts 706a, 706b. Prompt engineering module 706 leverages the vectors of layers 704a, 704c from vector store 702 to construct prompts 706a, 706b that are tailored to the specific use case and objectives of the LLM. Prompt engineering module 706 ensures that each prompt is logically structured and contextually appropriate.

In some implementations, prompt engineering module 706 combines the retrieved vectors (or portions of the retrieved vectors) into structured prompts. Prompt engineering module 706 selects vectors that are relevant to the specific use case and combines them in a way that follows a logical flow (e.g., based on previous responses to previously supplied prompts). For example, if the task is to create a prompt for a cybersecurity application focused on data encryption, the prompt engineering module 706 can retrieve vectors related to encryption standards, best practices, and regulatory requirements. These vectors are then assembled into a prompt that guides the pre-trained LLM through a series of structured questions or scenarios using prompt engineering.

Prompt engineering is a process of structuring text that is able to be interpreted by a generative AI model. For example, in some embodiments, a prompt (e.g., command set) includes the following elements: instruction, context, input data, and an output specification. Although a prompt is a natural-language entity, a number of prompt engineering strategies help structure the prompt in a way that improves the quality of output. For example, in the prompt "Please generate an image of a bear on a bicycle for a children's book illustration," "generate," is the instruction, "for a children's book illustration" is the context, "bears on a bicycle" is the input data, and "an image" is the output specification. The techniques include being precise, specifying context, specifying output parameters, specifying target knowledge domain, and so forth. Automatic prompt engineering techniques have the ability to, for example, include using the pre-trained LLM to generate a plurality of candidate prompts, automatically score the candidates, and select the top candidates.

In some embodiments, prompt engineering includes the automation of a target process—for instance, a prompt causes an AI model to generate computer code, call functions in an API, and so forth. Additionally, in some embodiments, prompt engineering includes automation of the prompt engineering process itself—for example, an automatically generated sequence of cascading prompts, in some embodiments, include sequences of prompts that use tokens from pre-trained LLM outputs as further instructions, context, inputs, or output specifications for downstream pre-trained LLMs. In some embodiments, prompt engineering includes training techniques for LLMs that generate prompts (e.g., chain-of-thought prompting) and improve cost control (e.g., dynamically setting stop sequences to manage the number of automatically generated candidate prompts, dynamically tuning parameters of prompt generation models or downstream models).

To ensure the prompts are logically structured and contextually appropriate, prompt engineering module 706 can apply rules or templates that dictate the organization and format of the prompts. For instance, a template can specify that a prompt should begin with a general question about encryption principles, followed by specific scenarios that test the pre-trained LLM's understanding of management and compliance with regulatory standards. In some implementations, prompt engineering module 706 can use machine learning techniques to enhance the prompt construction process. For example, prompt engineering module 706 can employ clustering algorithms to group similar vectors together, ensuring that related concepts are presented in a coherent manner.

Prompts 706a and 706b represent the outputs of the prompt engineering process. Prompts 706a and 706b are constructed from particular layers (i.e., layers 704a, 704c) from vector store 702, resulting in inputs that guide the LLM through a multi-phase reasoning process. The layered structure of the prompts allows for a more granular examination of the LLM's decision-making, enabling better interpretability.

Figure 8:
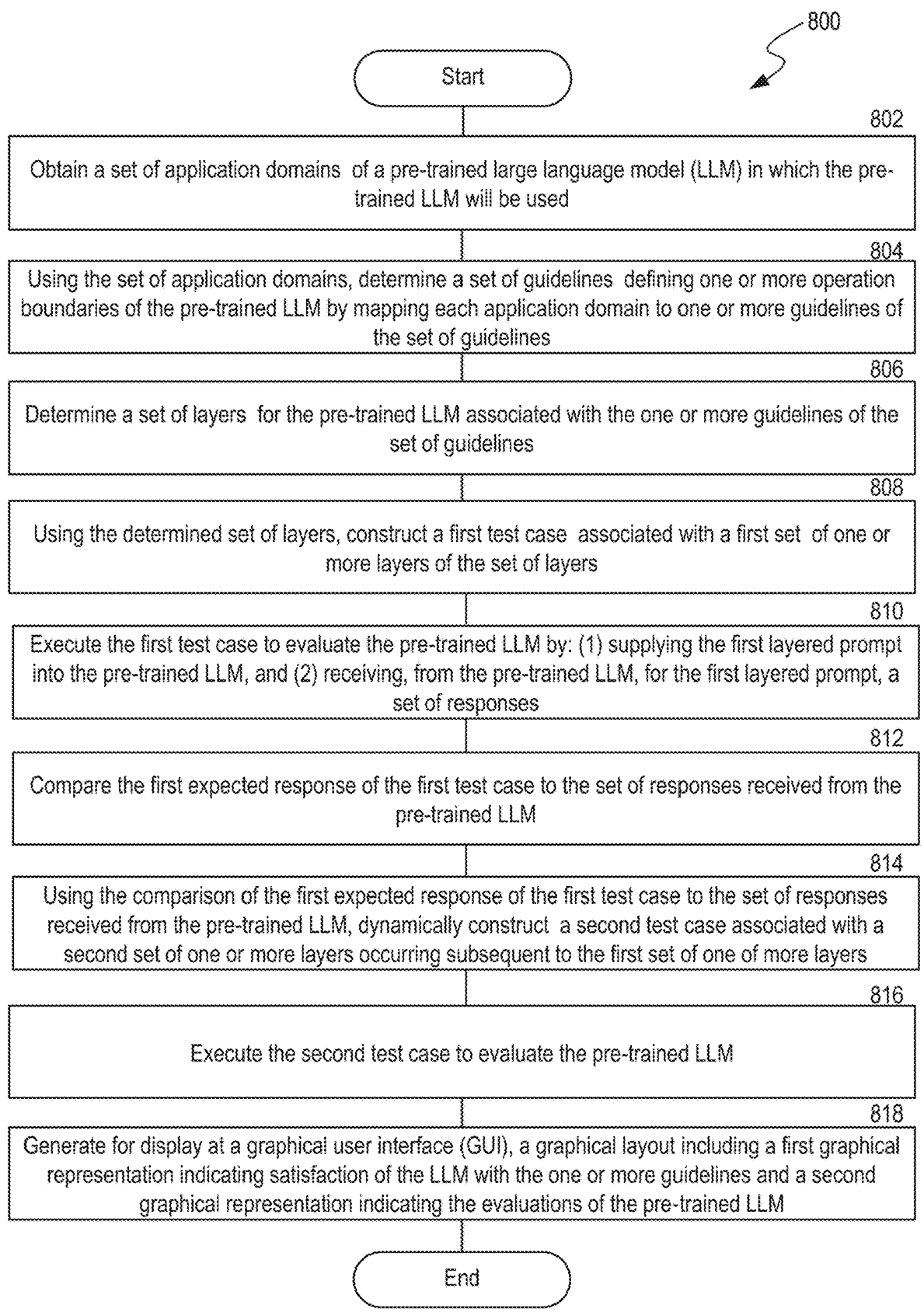
FIG. 8 is an illustrative diagram illustrating an example environment for dynamically generating layered prompts to operate as input in an LLM.

FIG. 8 is a flow diagram illustrating a process 800 of constructing a layered prompt, in accordance with some implementations of the present technology. In some implementations, the process 800 is performed by components of example computer system 1300 illustrated and described in more detail with reference to FIG. 13. Particular entities, for example, an LLM, are illustrated and described in more detail with reference to LLM 504 in FIG. 5. Likewise, implementations can include different and/or additional steps or can perform the steps in different orders.

In act 802, the system obtains a set of application domains of a pre-trained large language model (LLM) in which the pre-trained LLM will be used. The pre-trained LLM generates, in response to a received input, a response. In some implementations, the application domains can be received as an input. For example, the input can be provided by users, administrators, or automated systems responsible for configuring and deploying the pre-trained LLM. Users can specify the intended application domains based on their knowledge of the model's capabilities and the requirements of their organization or use case. In some implementations, the system can determine the application domain of the pre-trained LLM by parsing through the metadata. Metadata associated with the pre-trained LLM can include information about the pre-trained LLM's training data, objectives, intended use cases, and other relevant details. By analyzing this metadata, the system can infer the potential application domains where the pre-trained LLM is likely to be effective and appropriate. For example, if the training data of the pre-trained LLM specifies multiple fields related to cybersecurity (e.g., access timestamp, access location, userID, authentication success), the system can infer, using an ML model trained on labeled data indicating the application domains of sample data, that the pre-trained LLM has at least one application domain focused on cybersecurity.

In some implementations, the system can maintain a catalog of application domains. The system can gather and organize information from various sources, such as receiving direct input from users or extracting application domains from external sources. The catalog of application domains serves as a repository that helps the system in understanding the various contexts (e.g., application domains) in which pre-trained LLMs can be deployed. For example, the system identifies relevant sources of information (e.g., industry-specific guidelines, regulatory requirements). Structured data formats can be used to store tabular information, while unstructured formats like text files or documents can capture more complex information. Additionally, vectorized representations can be used to encode semantic information, facilitating advanced retrieval techniques such as retrieval-augmented generation (RAG).

To ensure the catalog remains accurate and up-to-date, the system can include versioning and timestamping of each application domain. Versioning allows for tracking changes over time, providing a historical record of how application domains have evolved. Timestamps indicate when the information was last updated, ensuring users can assess the currency of the data. For instance, regulatory requirements might change frequently, and having versioned records ensures that pre-trained LLMs can be tested against the most current standards. Metadata can be created to add context and facilitate search and retrieval. Examples of metadata include the regulation name, descriptive names, and other relevant identifiers. In some implementations, the system can identify application domains of the pre-trained LLM using a metadata lookup against guideline data stores or remote sources. By querying metadata repositories, the system can automatically infer the application domains relevant to the model, thus reducing the need for manual input. For example, if a metadata repository includes descriptions of different pre-trained LLMs, the pre-trained LLM's corresponding training data, performance metrics, and/or associated guidelines, when a new pre-trained LLM is introduced, the system can perform a metadata lookup to find matches or similarities with existing models in the repository. This process involves comparing the model's metadata—such as its objectives, training data sources, and functional specifications—with the stored metadata of other models. If the system identifies a close match, it can infer that the new model belongs to the same or a similar application domain. For example, if an pre-trained LLM's metadata indicates that it was trained on financial transaction data and designed to detect fraud, the system can automatically classify it under the domain of financial security or fraud detection.

In act 804, using the set of application domains, the system determines a set of guidelines defining one or more operation boundaries of the pre-trained LLM by mapping each application domain of the set of application domains to one or more guidelines of the set of guidelines.

The system can, from the obtained set of application domains, determine relevant guidelines that are applicable to the pre-trained LLM's use case (e.g., generating a certain set of guidelines for any pre-trained LLM used in the finance industry, and generating another set of guidelines for any pre-trained LLM used in the healthcare industry. Having consistent guidelines for each industry allows the pre-trained LLMs to be benchmarked more accurately against its peers, as the pre-trained LLMs are evaluated against the same guidelines. Additionally or alternatively, the system can create a new set of relevant guidelines for each pre-trained LLM. The system can evaluate metadata tags, keywords, or categories associated with the guidelines stored in the system's database. Using the specific context and requirements of the AI application, the system filters and retrieves the relevant guidelines from the database.

Various filters can be used to select relevant guidelines. In some implementations, the system uses natural language processing (NLP) to parse through the text of the guidelines and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant guidelines.

To identify the relevant guidelines from guidelines stored in vector stores, the system can determine the specific terms to use as filters by calculating the similarity between vectors representing application-domain-specific terms (e.g., "healthcare") and vectors representing other terms related to the domain (e.g., "patient privacy"), application-domain-specific terms can be identified based on the proximity of the other terms to known terms of interest. A similarity threshold can be applied to filter out terms that are not sufficiently similar to known application-domain-specific terms.

In some implementations, the system can tag relevant guidelines with attributes that help contextualize the relevant guidelines. The tags serve as markers that categorize and organize the guidelines based on predefined criteria, such as the application domain itself, and/or narrower context such as the regulatory topics (e.g., data privacy, fairness, transparency) or jurisdictional relevance (e.g., regional regulations, industry standards). The tags provide a structured representation of the guidelines and allow for easier retrieval, manipulation, and analysis of regulatory content. The tags and associated metadata can be stored in a structured format, such as a database, where each guideline is linked to the guideline's corresponding tags and application domains. Additionally, the guidelines can be represented in a vector space model, where each guideline is mapped to a high-dimensional vector representing the guideline's semantic features and relationships with other guidelines.

In some implementations, the system determines the set of guidelines, via an ML model, using a location of the pre-trained LLM, a use case of the pre-trained LLM, and/or data sources used in the pre-trained LLM. When a new LLM is introduced, the ML model can analyze metadata associated with the LLM, such as the LLM's deployment location, intended application, and data sources. Based on this analysis, the ML model generates predictions about the relevant guidelines that should be considered for evaluating the LLM's performance and compliance. In some implementations, rule-based systems are used to determine the relevant guidelines. Predefined rules and decision criteria can be applied to each LLM to infer the relevant guidelines. For example, certain application domains are assigned or mapped to a set of predefined guidelines.

With the set of application domains, the system can identify specific fields (e.g., features or variables of the data) used in each step of the LLM's operations. For example, in a threat detection domain, the necessary fields can include network traffic data, user activity logs, and known threat signatures. In some implementations, the guidelines are used to determine a breakdown of positive values for certain fields (e.g., enumerations). Enumerations can include predefined lists of acceptable values or ranges that a field can take. For instance, in an access control LLM, enumerations can include the different roles or permission levels within an organization.

For example, in an LLM designed for financial fraud detection, the appropriate application domain can be determined by analyzing guidelines related to financial transactions, regulatory compliance, and fraud patterns. External sources, such as updates from financial regulatory bodies, can be used to determine the relevant guidelines. The system identifies fields used in the application domain, such as transaction amount, frequency, account history, and geolocation. Using the guidelines, the system defines enumerations for transaction types, acceptable geographical regions, and frequency thresholds.

In act 806, the system determines a set of layers for the pre-trained LLM associated with the one or more guidelines of the set of guidelines. Each layer within the set of layers includes a set of variables associated with the one or more guidelines of each corresponding layer. Each variable in the set of variables represents an attribute identified within the one or more guidelines of each corresponding layer. The set of guidelines can include governmental regulations of a specific jurisdiction, organization-specific regulations, and/or generative AI applications.

In some implementations, the system receives an indicator of a type of application associated with the pre-trained LLM. The system identifies a relevant set of layers associated with the type of the application defining one or more operation boundaries of the pre-trained LLM. The system can obtain the relevant set of layers, via an Application Programming Interface (API). The type of application can be, for example, the field in which the pre-trained LLM is to be deployed (e.g., finance, healthcare). The system can test the same pre-trained LLM using different application domains for different results based on the benchmarks of the particular field. For example, an AI model used in both the financial and healthcare fields can be graded twice under different application domains, and receive potentially different grades.

In some implementations, the set of layers can be dynamically determined by an ML model. The ML model can identify the set of application domains associated with the pre-trained LLM. Methods of dynamically determining the set of layers are described in further detail with reference to act 802 in FIG. 8.

In some implementations, subsequently constructed layered prompts are more complex than preceding layered prompts. For example, the variables of the second set of the one or more layers of the set of layers can be more complex than the variables of the first set of the one or more layers of the set of layers. For example, variables of the first set of layers can include straightforward data points such as IP addresses, timestamps, or simple yes/no questions about the presence of security protocols. Variables of the second set of layers can include more complex patterns of network traffic.

In some implementations, subsequently constructed layered prompts are more complex than preceding layered prompts. The complexity increase can include increases in computations or mathematical representations. For example, initial layers can use simple statistical summaries or basic arithmetic operations, while subsequent layers could incorporate complex algorithms or probabilistic models. For example, in financial applications, preceding layered prompts can include basic revenue figures or simple growth rates, while subsequent layered prompts can require the LLM to interpret stochastic models predicting market trends. In some implementations, the functions within the layered prompts (e.g., via the variables) can become more complex between layers. In another example, preceding layered prompts can include simple logical functions or direct mappings, whereas subsequent layered prompts can involve nested functions, recursive algorithms, or optimization problems. For example, in a routing model, initial layers might handle straightforward route calculations, while subsequent layers can manage dynamic routing optimizations considering real-time traffic data, fuel consumption models, and delivery constraints.

In some implementations, subsequently constructed layered prompts have greater computational complexity, which is associated with time (e.g., sequence length, dimensionality) and space (e.g., number of parameters, memory required, number of layers). Sequence length refers to the length of input or output sequences processed by the AI model. Longer sequences require more computation, as each token or word in the sequence must be processed and contextualized within the entire sequence. A longer sequence can increase the complexity of computation due to the longer time required for training and inference. Dimensionality refers to the size of the input and output vectors, representing the data processed by the AI model. Higher dimensionality means each data point is represented with more features, increasing the complexity of the computations the AI model performs. The number of parameters refers to the total count of weights and biases in the model, which directly impacts the model's ability to learn and generalize from data. Greater parameters can mean more complex and potentially more accurate models, but greater parameters also require increased memory and computational resources to manage. Memory required includes the amount of RAM or other memory resources needed to store the model parameters and intermediate computation results during training and inference.

The complexity of layered prompts in an AI model affects both time and space complexity. Added complexity can add additional computation and storage requirements, as the data must pass through multiple transformations and computations from input to output. More layers being covered in a layered prompt generally allow the model to capture more complex patterns and dependencies in the data, but more layers also increase the overall computational load and memory usage.

The set of layers can be an LLM-specific set of layers. In some implementations, the system receives an input indicative of an overall set of layers and the set of variables for each layer of the overall set of layers. Using an ML model, the system can identify the application domains within the overall set of layers with the obtained application domains related to the pre-trained LLM. The system can extract the LLM-specific set of layers from the overall set of layers using the comparison.

In some implementations, one or more of the layers within the set of layers can relate to attempts to access data. The corresponding set of variables can relate to an author associated with the attempt, a timestamp associated with the attempt, a location associated with the attempt, a presence of an authorization related to the attempt, previous unsuccessful attempts to access the data, and/or frequency of the attempts. Further examples of layers related to attempts to access data are discussed with reference to FIG. 7.

In some implementations, one or more of the layers within the set of layers can relate to quality of input data. The corresponding set of variables can relate to an author associated with the input data, a timestamp associated with the input data, a location associated with the input data, a presence of structured metadata, an absence of structured metadata, and/or outliers in the input data. Further examples of layers related to data quality are discussed with reference to FIG. 7.

In act 808, using the determined set of layers, the system constructs a first test case associated with a first set of one or more layers of the set of layers. The first test case maps to a first scenario derived from the first set of one or more layers of the set of layers. The first test case includes: (1) a first layered prompt and (2) a first expected response. The first test case tests the one or more operation boundaries of the corresponding guidelines of the first set of the one or more layers of the set of layers. Methods of constructing the first layered prompt are discussed with reference to prompts 706a, 706b in FIG. 7.

In some implementations, to construct the layered prompt for each layer, the system can transform the layers of the LLM using a rule-based engine. For example, the system can project/map the layers and/or variables of the LLM onto parameters that can operate within an LLM. Each layered prompt is configured to direct an LLM to perform specific computations that contribute to the overall decision-making process. The rule-based engine maps each layer to a particular set of metrics. For example, the rule-based engine can map a layer's task of identifying part-of-speech tags in text to specific metrics that are responsible for recognizing syntactic patterns. Similarly, a layer focused on sentiment analysis can be mapped to parameters that detect positive or negative word usage based on historical data.

The expected response is what the system anticipates the LLM should output when processing the first layered prompt. This could be a specific action or decision, such as flagging a transaction for further review, generating an alert for a potential rule violation, or providing a rationale for why a transaction is considered compliant. The expected response serves as a benchmark to evaluate the LLM's performance and adherence to the guidelines.

In act 810, the system executes the first test case to evaluate the pre-trained LLM. The system supplies the first layered prompt into the pre-trained LLM. Responsive to inputting the first layered prompt, the system receives, from the pre-trained LLM, for the first layered prompt, a set of responses.

Inputting the prompt can use an API or a command interface that communicates with the pre-trained LLM. After supplying the first layered prompt, the pre-trained LLM interprets the prompt according to the pre-trained LLM's training. The set of responses results from the LLM applying its internal algorithms and learned knowledge to produce outputs that align with the rules and constraints defined in the prompt. The responses can vary depending on the complexity of the prompt and the specific layers involved. For example, in a compliance-checking scenario, the responses might include flagged transactions, risk scores, or explanations for why certain transactions are deemed suspicious.

In act 812, the system compares the first expected response of the first test case to the set of responses received from the pre-trained LLM. In some implementations, the system automatically evaluates the received responses against the expected responses defined in the test case. This involves comparing the LLM's outputs to the predefined criteria to determine whether the LLM's reasoning and decision-making are correct and compliant. For example, if the prompt included a known fraudulent transaction, the expected response can be for the LLM to flag it appropriately. The system checks if the LLM's response matches this expectation.

In act 814, using the comparison of the first expected response of the first test case to the set of responses received from the pre-trained LLM, the system dynamically constructs a second test case associated with a second set of one or more layers of the set of layers occurring subsequent to the first set of one of more layers of the set of layers. The second test case maps to a second scenario derived from the second set of one or more layers of the set of layers. The second test case includes: (1) a second layered prompt and (2) a second expected response. The second test case tests the one or more operation boundaries of the corresponding guidelines of the second set of the one or more layers of the set of layers. In some implementations, the second set of the one or more operation boundaries of the set of guidelines is different from the first set of the one or more operation boundaries of the set of guidelines. In some implementations, the second set of the one or more operation boundaries of the set of guidelines is the same as the first set of the one or more operation boundaries of the set of guidelines.

For example, to construct the second test case, the system can first assess, based on the comparison of the first expected response of the first test case to the set of responses received from the pre-trained LLM, both the current and target requirements or guidelines (e.g., jurisdictional, organizational, AI-type specific). In a cybersecurity context, the system can identify existing cybersecurity protocols, frameworks, and technologies in use, alongside defining the desired cybersecurity posture aligned with organizational goals, regulatory standards, and industry best practices. The system can identify any gaps or deficiencies between the current and target requirements or guidelines. For example, in a cybersecurity context, gaps can encompass areas such as network security, data protection measures, access controls, and/or incident response protocols. Once the system understands the gaps, the system can prioritize the layers used within subsequent test cases (e.g., by adjusting the weights of particular layers, by omitting or including certain layers). For example, layers can be ranked based on their relevance to the organization's mission, legal and regulatory requirements, and/or risk management expectations. Moreover, the system can continuously monitor and track progress toward addressing the identified gaps to adjust the layers (e.g., by adjusting the weights of particular layers, by omitting or including certain layers) based on the sets of responses received from the LLM.

In some implementations, the gap can be identified using a machine learning model trained on labeled training data to learn patterns and relationships between features and guideline sources. For example, the labeled training data can be sets of guidelines based on the type of guideline they belong to (e.g., current guideline, target guideline). Using the trained model, the system can use the trained model to identify differences between the sets of guidelines by analyzing the features that contribute most to the classification decision (e.g., current guideline, target guideline) of each set of guidelines and identifying areas of divergence or overlap between the guidelines.

In act 816, the system executes the second test case to evaluate the pre-trained LLM. Executing the second test case is done in the same or similar manner as executing the first test case in act 810 with reference to FIG. 8.

In act 818, the system generates for display at a graphical user interface (GUI), a graphical layout including a first graphical representation indicating satisfaction of the LLM with the one or more guidelines of the set of guidelines of the corresponding application domain and a second graphical representation indicating the evaluations of the pre-trained LLM by the first test case and the second test case.

The first graphical representation can be a summary of how well the LLM's responses align with the predefined rules and constraints of the application domain. For example, the first graphical representation can be visualized using a compliance score, where a higher score indicates greater adherence to the guidelines. Alternatively, a color-coded system (e.g., green for compliant, yellow for partial compliance, red for non-compliance) can be used to provide a visual indicator of the LLM's performance against each guideline. The second graphical representation can include the LLM's performance metrics, such as accuracy, precision, recall, and other relevant indicators. A bar chart or line graph could be used to show changes in these metrics between the test cases, illustrating how the LLM's performance has evolved. Additionally, the GUI can include specific areas where the LLM has improved or needs further adjustment.

In some implementations, using the comparison of the first expected response of the first test case to the set of responses received from the pre-trained LLM, the system generates an indicator of the pre-trained LLM indicating compliance of the pre-trained LLM with the corresponding guidelines of the first set of the one or more layers of the set of layers. The indicator can indicate the first set of the one or more layers, the corresponding sets of variables of the first set of the one or more layers, and/or predetermined weights used for each layer of the first set of the one or more layers.

In some implementations, the graphical representation indicating satisfaction of the LLM with the one or more guidelines of the set of guidelines of the corresponding application domain includes a binary indicator indicating the satisfaction, a category indicating the satisfaction, and/or a probability of the satisfaction. The binary indicator can indicate whether the pre-trained LLM meets the specified criteria (e.g., compliance with cybersecurity measures) or fails to do so. A categorical grade reflects the overall performance of the pre-trained LLM in meeting the criteria established for that particular category. For example, grades may be categorized as "Excellent," "Good," "Fair," or "Poor," based on the degree of satisfaction demonstrated by the pre-trained LLM. A probability-based grade provides a quantitative measure of confidence in the assigned grade. The probability indicates the likelihood that the pre-trained LLM's performance aligns with the specified benchmarks for the application domain. In some implementations, rather than receiving a specific-type grade, the measurements taken from the assessment results are used as the grades themselves. In some implementations, in response to reaching a non-compliance threshold indicating an absence of adherence to the set of guidelines, the system can prevent assigning additional grades to preserve computing resources.

The system can assign a weight to each layer within the set of layers of the pre-trained LLM. Using the set of responses, the system can generate an overall score indicating satisfaction with the one or more operation boundaries of the corresponding guidelines of the first set of the one or more layers of the set of layers in accordance with the assigned weight of the first layer. The weights can change based on the type of AI application. For example, for a security AI model, cybersecurity-related application domains such as data encryption or vulnerability management may carry higher weights due to their higher importance in ensuring system security. In some implementations, the system generates confidence scores for each assigned grade. The confidence scores represent a reliability of the assigned grade.

In some implementations, the system can identify one or more new layers within the set of responses, and iteratively update the set of layers by adding the one or more new layers to the set of layers. Methods of iteratively updating the set of layers are described in further detail with reference to act 802 in FIG. 8.

Layered Measurement, Scoring, and Evaluation of Pre-Trained LLMs

Figure 9:
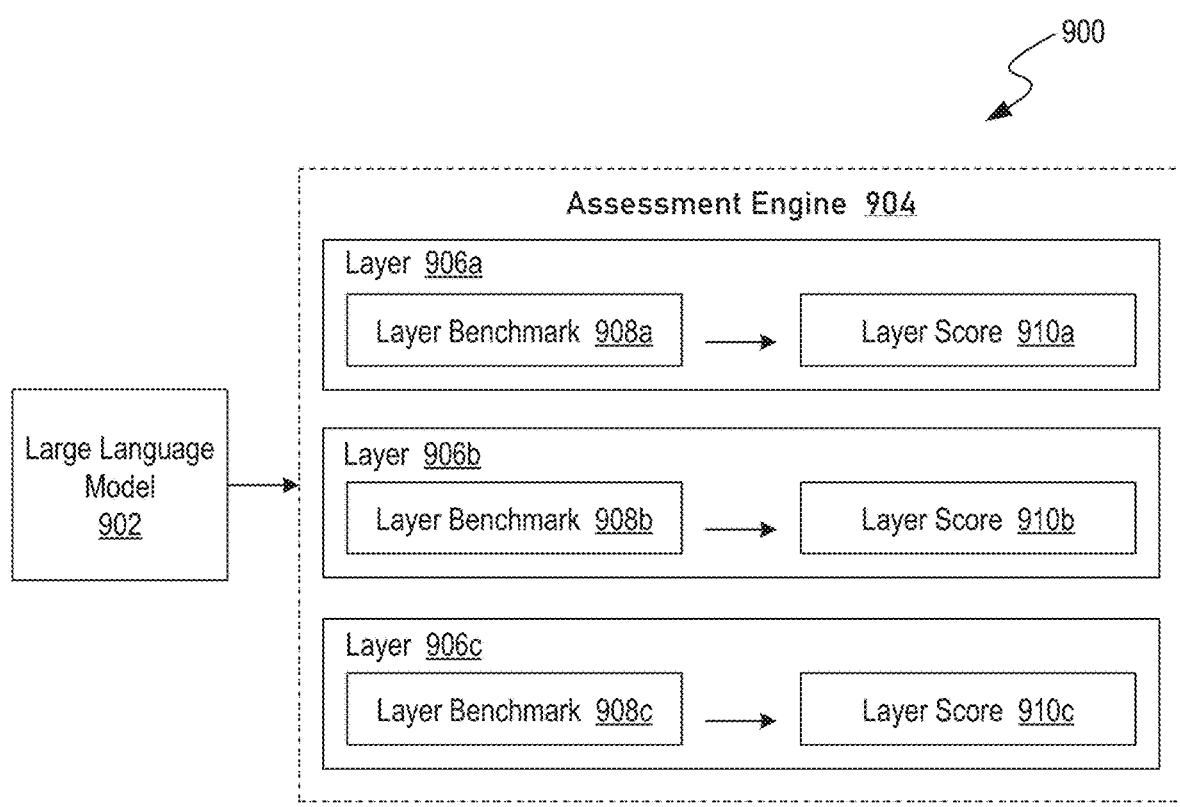
FIG. 9 is an illustrative diagram illustrating an example environment for evaluating an AI model's performance across multiple layers of evaluation by using layered prompt engineering.

FIG. 9 is an illustrative diagram illustrating an example environment for evaluating an AI model's performance across multiple layers of evaluation by using layered prompt engineering. Environment 900 includes an LLM 902, assessment engine 904, layers 906a-c, layer benchmarks 908a-c, and layer scores 910a-c. LLM 902 is the same as or similar to LLM 504 illustrated and described in more detail with reference to FIG. 5. Assessment engine 904 is implemented using components of example computer system 1300 illustrated and described in more detail with reference to FIG. 13. Likewise, implementations of example environment 900 can include different and/or additional components or can be connected in different ways.

The assessment engine 904 obtains application domains where the LLM 902 will be used and/or deployed in. The assessment engine 904 determines a set of layers 906a-c, each associated with specific variables. Layers 906a-c are the same as or similar to layers 106a-n and layers 606a-n, 608a-n illustrated and described in more detail with reference to FIG. 1 and FIG. 6, respectively. In some implementations, layers 606a-n, 608a-n within the LLM can be versioned and stored along with metadata, as discussed further with reference to FIG. 1. The layers 906a-c form are used to construct layered prompts (e.g., prompts 506a, 506b, layered prompts 502a-n), to test the LLM's 902 responses systematically. Methods of constructing layered prompts are discussed with reference to FIGS. 5-8.

By inputting the layered prompts into the LLM 902 and comparing the received LLM 902 responses to expected outcomes, the assessment engine 904 can evaluate the LLM 902 performance. Layer benchmarks 908a-c within each layer are used to evaluate the pre-trained LLM's 902 performance for the particular layer. The layer benchmarks 908a-c are predefined standards and criteria tailored to evaluate particular aspects of the pre-trained LLM's 902 performance. Each benchmark of the layer benchmarks 908a-c corresponds to specific guidelines corresponding to the LLM's 902 application domains. The layer benchmarks 908a-c can include various performance criteria or thresholds, such as accuracy, consistency, bias detection, and adherence to regulatory standards. The evaluation using the layer benchmarks 908a-c includes a set of assessments that are applied to the pre-trained LLM 902. For each assessment, the system determines the LLM's 902 degree of satisfaction. Methods of a layered assessment of the LLMs are described with reference to FIG. 11. The results of all the assessments for each layer are then aggregated and/or mapped to specific layer scores 910a-c, which indicates the pre-trained LLM's 902 adherence and/or degree of satisfaction to operational boundaries of the predefined guidelines for the corresponding layer.

The layer scores 910a-c are the outcomes of the evaluation process, representing the scores assigned to the LLM 902 for its performance in the assessments for the specific layer according to the layer benchmarks 908a-c. The layer scores 910a-c can be derived by comparing the LLM's 902 responses to the expected outcomes defined in the layer benchmarks 908a-c for each assessment. For instance, a layer score can reflect how well the LLM adheres to ethical guidelines, maintains data quality, or handles specific types of input. By determining the layer-specific scores 910a-c, the assessment engine 904 can provide a nuanced understanding of the LLM's 902 strengths and weaknesses across different aspects (e.g., layers) of its functionality.

Figure 10:
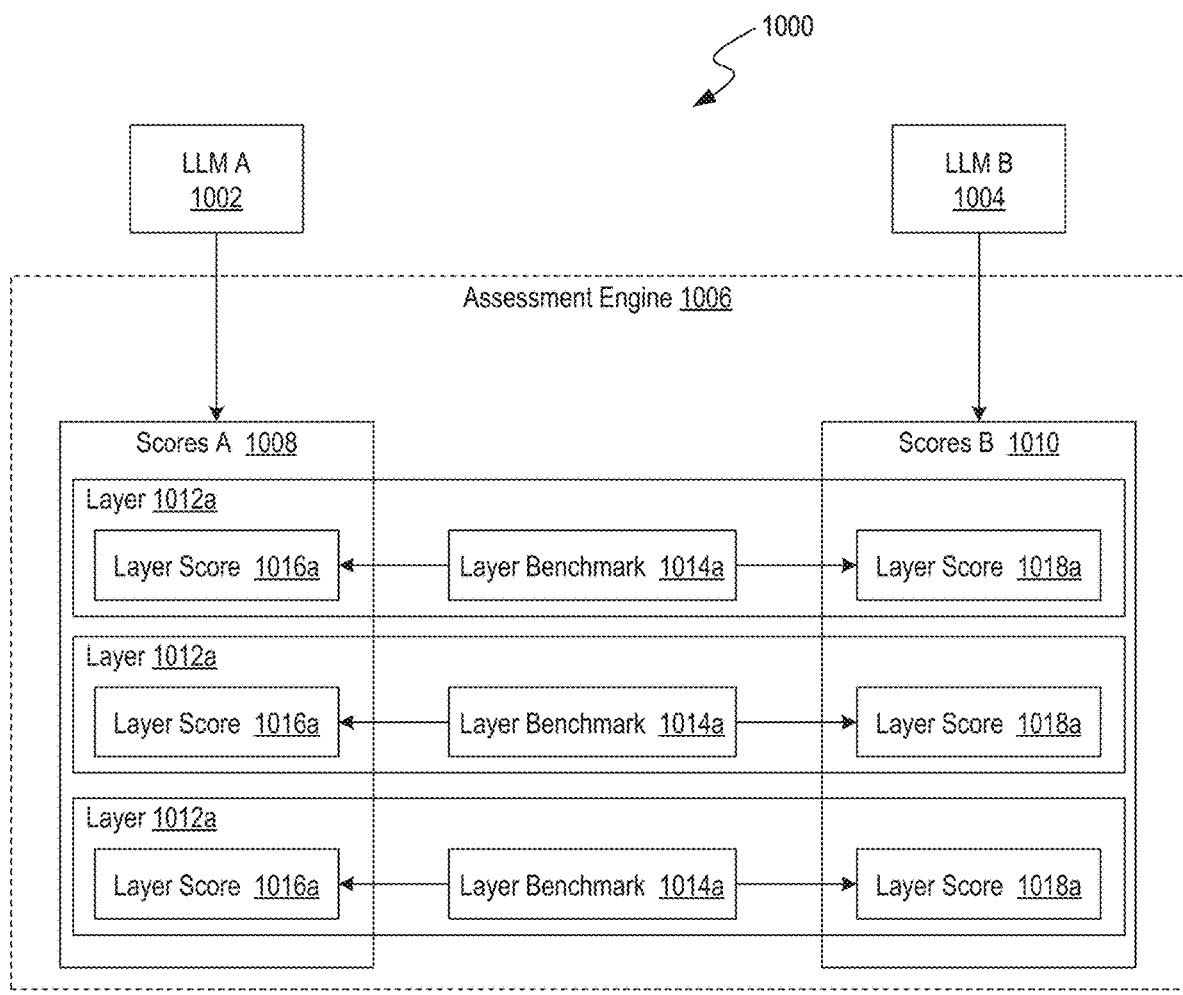
FIG. 10 is an illustrative diagram illustrating an example environment for comparing different AI models based on assigned scores across the multiple layers of evaluation.

FIG. 10 is an illustrative diagram illustrating an example environment for comparing different AI models using assigned scores across the multiple layers of evaluation. Environment 1000 includes an LLM 1002, 1004, assessment engine 1006, scores 1008, 1010, layers 1012a-c, layer benchmarks 1014a-c, and layer scores 1016a-c, 1018a-c. LLM 1002, 1004 is the same as or similar to LLM 504 and LLM 902 illustrated and described in more detail with reference to FIG. 5 and FIG. 9, respectively. Assessment engine 1006 is the same as or similar to assessment engine 904 illustrated and described in more detail with reference to FIG. 9. Layers 1012a-c are the same as or similar to layers 106a-n, layers 606a-n, 608a-n, and layers 906a-c illustrated and described in more detail with reference to FIG. 1, FIG. 6, and FIG. 9, respectively. Layer benchmarks 1014a-c are the same as or similar to layer benchmarks 908a-c illustrated and described in more detail with reference to FIG. 9. Layer scores 1016a-c, 1018a-c are the same as or similar to layer scores 908a-c illustrated and described in more detail with reference to FIG. 9. Assessment engine 1006 is implemented using components of example computer system 1300 illustrated and described in more detail with reference to FIG. 13. Likewise, implementations of example environment 1000 can include different and/or additional components or can be connected in different ways.

Pre-trained LLMs (e.g., LLM A 1002 and LLM B 1004) are evaluated by assessment engine 1006, which systematically scores the LLMs' 1002, 1004 performance using a set of predefined benchmarks (e.g., layer benchmarks 1014a-c) for each layer in layers 1012a-c. Methods of a layered assessment of the LLMs are described with reference to FIG. 11. In FIG. 10, for LLM 1002, the assessment engine 1006 generates scores (e.g., scores A 1008) containing layer scores 1016a-c corresponding to the layers 1012a-c. The layer scores 1016a-c can correspond to the LLM's 1002 adherence to guidelines within corresponding layers 1012a-c (e.g., data quality, regulatory compliance). Each layer score 1016a-c reflects how well LLM 1002 meets the expectations set for that particular dimension of evaluation. For example, layer score 1016a indicates how well LLM 1002 satisfies layer benchmark 1014a. Similarly, LLM 1004 can also be evaluated by the assessment engine 1006, resulting in scores (e.g., scores B 1010) containing layer scores 1018a-c corresponding to the layers 1012a-c. Scores 1010 similarly offers a detailed breakdown of the LLM's 1004 performance across various layers 1012a-c of assessment. For example, layer score 1018a indicates how well LLM 1004 satisfies layer benchmark 1014a.

By comparing layer scores 1016a-c and layer scores 1018a-c of LLM 1002 and LLM 1004, respectively, users can gain insights into the relative performance of each model in specific areas. Since LLM 1002 and LLM 1004 are evaluated against the same set of benchmarks (e.g., layer benchmarks 1014a-c) and layers (e.g., layers 1012a-c) by assessment engine 1006, the LLMs 1002, 1004 can be compared more effectively. This standardized evaluation framework ensures that both LLMs 1002, 1004 are subjected to identical criteria and provides an objective basis for comparison. The use of consistent benchmarks, such as layer benchmarks 1014a-c, eliminates the variability and bias that might arise from different evaluation methods. Additionally, instead of providing an overall performance score, the layered evaluation breaks down the performance into modular components. For instance, if LLM 1002 excels in data quality but falls short in regulatory compliance, users can clearly identify the LLM's strengths and weaknesses.

The layered model method (as discussed with reference to FIGS. 1-4) and layered prompting/evaluation method (as discussed with reference to FIGS. 5-11) can be applied to models other than LLMs, such as Small Language Models (SLMs) and Medium Language Models (MLMs), by decomposing the application domain/guidelines into distinct layers 1012a-c and corresponding variables. Though AI models such as SLMs and MLMs process contextual information in prompts differently than LLMs, constructing the set of layers 1012a-c remains consistent regardless of the model type.

In a layered model method, layers are integrated within the model's architecture and training processes to ensure that the model processes the layered information. In a layered prompting/evaluation method, contextual layers 1012a-c are embedded within prompts to provide structured information sequentially to measure the AI model against the layered benchmarks 1014a-c. In some implementations, if the context in the layered prompts does not significantly impact the model's output, the layered prompting/evaluation and layered model methods can yield convergent results. The convergence can indicate that the additional context provided in layered prompts is redundant and already aligns with the layered model's structure. For example, SLMs, which have smaller parameter sets and simpler architectures, may not utilize prompt context as deeply as MLMs, which have more capacity for understanding and integrating context, and thus may yield convergent results in the model's output using layered prompts and layered models.

Figure 11:
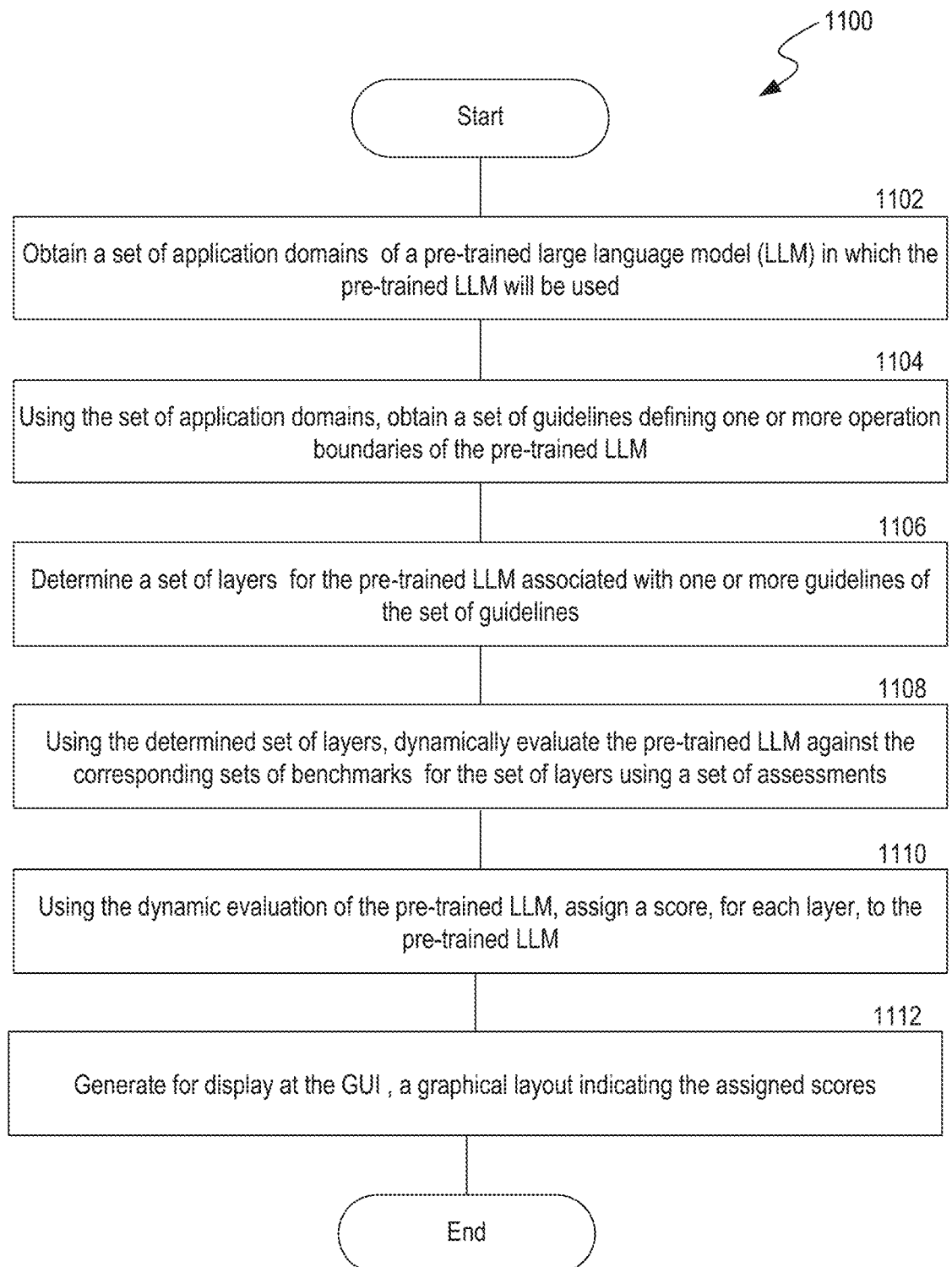
FIG. 11 is a flow diagram illustrating a process of evaluating an AI model using layered prompts, in accordance with some implementations of the present technology.

FIG. 11 is a flow diagram illustrating a process of evaluating an AI model using layered prompts, in accordance with some implementations of the present technology. In some implementations, the process 1100 is performed by components of example computer system 1300 illustrated and described in more detail with reference to FIG. 13. Particular entities, for example, an LLM, are illustrated and described in more detail with reference to LLM 504 in FIG. 5. Likewise, implementations can include different and/or additional steps or can perform the steps in different orders.

In act 1102, the system obtains a set of application domains of an AI model (e.g., such as a pre-trained LLM) in which the pre-trained LLM will be used. The pre-trained LLM can generate, in response to a received input, a response. Methods of determining a set of application domains of an AI model are discussed with reference to act 802 in FIG. 8.

In act 1104, using the set of application domains, the system obtains a set of guidelines defining one or more operation boundaries of the pre-trained LLM. Methods of determining a set of guidelines of an AI model are discussed with reference to act 804 in FIG. 8. In some implementations, the system can determine the set of guidelines, via a ML model, using a location of the AI model, a use case of the AI model, and/or data sources used in the AI model. Methods of determining a set of guidelines of an AI model via an ML model are discussed with reference to act 804 in FIG. 8.

In some implementations, the set of guidelines includes governmental regulations of a specific jurisdiction, organization-specific regulations, and/or AI application type-specific guidelines. Jurisdictional guidelines (e.g., regulations) can include guidelines gathered from authoritative sources such as government websites, legislative bodies, and regulatory agencies. Jurisdictional guidelines can be published in legal documents or official publications and cover aspects related to the development, deployment, and use of AI technologies within specific jurisdictions. Depending on the jurisdiction in which the platform operates, the guidelines may vary. Organizational policies include internal policies, or best practices established by organizations to govern AI-related activities within the organization's operations. Organizational policies can be developed in alignment with industry standards, legal requirements, and organizational objectives. Organizational policies can include standards for acceptable content, and/or procedures for determining violations. Additionally, each type of AI application presents unique challenges and thus can result in different guidelines. For example, unsupervised learning algorithms, where the model learns from input data without labeled responses, can be subject to guidelines that prevent bias and discrimination in unsupervised learning models. Natural language processing (NLP) technologies, which enable computers to understand, interpret, and generate human language, can be subject to specific guidelines aimed at safeguarding user privacy. Generative AI, which autonomously creates new content, can focus on intellectual property rights, content moderation, and ethical use cases. AI developers may need to incorporate additional mechanisms for copyright protection, content filtering, and/or user consent management to comply with guidelines related to generative AI technologies.

In act 1106, the system determines a set of layers for the pre-trained LLM associated with one or more guidelines of the set of guidelines. Each layer within the set of layers is mapped to: (1) a set of variables associated with the one or more guidelines of each corresponding layer and (2) a set of benchmarks associated with the one or more guidelines of each corresponding layer. Each variable in the set of variables represents an attribute identified within the one or more guidelines of each corresponding layer. Examples of variables are discussed further with reference to FIG. 2 and FIG. 6. In some implementations, the set of layers can be determined by a received input. The received input indicates a set of application domains of the AI model in which the AI model will be used.

In some implementations, the system receives an indicator of a type of application associated with the pre-trained LLM. The system identifies a relevant set of layers associated with the type of the application defining one or more operation boundaries of the pre-trained LLM. The system obtains the relevant set of layers, via an API. Further methods of identifying the relevant set of layers are discussed with reference to FIG. 7 and FIG. 8.

In some implementations, the set of layers is an LLM-specific set of layers, and the system receives an input indicative of an overall set of layers and the set of variables for each layer of the overall set of layers. Using an ML model, the system compares the application domains within the overall set of layers with the obtained application domains related to the pre-trained LLM. The system extracts the LLM-specific set of layers from the overall set of layers using the comparison. Further methods of identifying the LLM-specific set of layers are discussed with reference to FIG. 8.

The set of layers can be dynamically determined by a ML model. The system determines a set of application domains of the AI model in which the AI model will be used. Using the set of application domains, the system identifies the set of guidelines defining the one or more operation boundaries of the AI model. Further methods of dynamically determining a set of layers by a ML model are discussed with reference to FIG. 7.

Each benchmark in the set of benchmarks indicates a degree of satisfaction of the pre-trained LLM with the one or more guidelines associated with the corresponding layer. The system can use existing frameworks or standards to define the benchmarks for each layer. By using a structured framework, the system ensures that the benchmarks are comprehensive, relevant, and standard within the community.

The degree of satisfaction (e.g., degree/level of compliance, level of satisfaction, degree/level of adherence) refers to the level to which a pre-trained LLM meets or aligns with specific guidelines or benchmarks associated with a particular assessment. Each benchmark within the set of benchmarks is a metric for measuring the LLM's satisfaction with these guidelines. The benchmark provides a quantifiable indication of how well the model performs in meeting the specified criteria or standards through its response to the layered prompt in a corresponding assessment. A high degree of satisfaction indicates a strong alignment with the guidelines, signifying that the model performs well according to the specified metrics. Conversely, a lower degree of satisfaction suggests areas where the model may fall short or require further refinement to better meet the established criteria. The quantification of the degree of satisfaction can take various forms, including numeric values, percentages, or qualitative assessments, depending on the nature of the guidelines and the metrics used for evaluation. For example, in a classification task, a numerical score can be an accuracy score that indicates the percentage of correctly predicted instances, while in language generation tasks, non-numerical metrics can gauge the quality of the generated text. Percentages can be used to indicate the proportion of criteria met or satisfied by the LLM out of the total number of criteria evaluated, with higher percentages indicating greater alignment with the specified criteria. In some implementations, the degree of satisfaction can be expressed as a range or scale. For example, a scoring system ranging from 1 to 10 could be used to rate the model's adherence to each benchmark, with higher scores indicating better alignment and lower scores suggesting areas for improvement. Qualitative assessments can be employed to characterize the degree of satisfaction. Descriptive categories such as "excellent," "good," "fair," or "poor" can be used to classify the model's performance relative to each benchmark for the particular layer.

In some implementations, one or more of the layers within the set of layers relate to the quality of training data of the pre-trained LLM. The corresponding set of tests (e.g., set of assessments, set of test cases) can relate to a presence of bias within the training data, a presence of structured metadata in the training data, and/or a presence of outliers in the training data. To evaluate the presence of bias within the training data, the system can design tests that assess the distribution of data across different demographic groups or attributes to identify any disproportionate demographic representations in the LLM's response. Similarly, the system can test to evaluate the presence of structured metadata in the training data. Metadata provides context and organization to the raw data, and can include labels, tags, or annotations that describe the characteristics and attributes of the data used by the LLM. Furthermore, the system can detect outliers within the training data, which are data points that deviate significantly from the rest of the dataset. Outliers can distort the training process and lead to inaccurate or unreliable LLM predictions. The tests can use anomaly detection algorithms to identify outliers and assess their impact on the LLM's performance.

In some implementations, the system can score an LLM's training data documentation by evaluating how well the documentation is recorded. The benchmarks can include predetermined criteria or metrics that the documentation should include. For example, in the context of cybersecurity, benchmarks can include requiring documentation to document the accuracy of malware detection and/or the speed of incident response. Additionally, the benchmarks can include requiring documentation that explains characteristics of the training data, such as, for example, explaining the criteria for measurement and the significance of each metric in assessing the model's performance. In some implementations, a higher score can be assigned to the documentation test category if the documentation includes the predetermined criteria or metrics in the benchmarks.

In some implementations, one or more of the layers within the set of layers relate to security measures of the pre-trained AI model. The corresponding set of tests can relate to data encryption in the pre-trained AI model, access controls of the pre-trained AI model, vulnerability management of the pre-trained AI model, threat detection of the pre-trained AI model, and/or remediation actions of the pre-trained AI model. For example, testing for data encryption can include testing the encryption methods used by the model and ensuring they comply with industry-standard cryptographic protocols (e.g., which can overlap with application domain (s) related to regulatory compliance.

To test for data encryption, the system can examine the AI model's code, the libraries the AI model utilizes, and the data transformations the AI model performs to identify any encryption mechanisms employed. By doing so, the system can verify whether the model uses approved ciphers and techniques, ensuring compliance with security standards. For example, the system obtains the keys necessary to decrypt any encrypted data within the model. Once the keys are secured, the system can decrypt the data and compare it against the guidelines to ensure the data was encrypted using approved ciphers and techniques. This involves checking the encryption algorithms, key lengths, and other cryptographic parameters against established security standards. The system can check if the functions and libraries of the AI model are recognized and approved for use according to the security guidelines. For example, if the model uses a third-party encryption library, the system can verify that this library is up-to-date and has not been flagged for security vulnerabilities. Additionally, the system can check that the implementation of encryption follows best practices, such as proper key management and secure handling of cryptographic operations. The system can also monitor the data flows within the AI model during runtime. This involves tracing the path of data as the data moves through the AI model, identifying points where data is encrypted or decrypted, and verifying that the operations comply with the security guidelines. For instance, the system checks whether sensitive data is encrypted before being stored or transmitted, and whether the data is properly decrypted when accessed for processing. By monitoring these data flows, the system can detect any deviations from the expected encryption practices and flag potential security issues.

Access control tests may involve examining user authentication procedures to ensure that only authorized individuals or systems can interact with the AI model and that access permissions are properly enforced to prevent unauthorized access or misuse. Vulnerability tests can identify potential vulnerabilities or weaknesses in the AI model's infrastructure, software components, or dependencies. Threat detection can involve evaluating the AI model's ability to detect and respond to various types of cybersecurity threats, including malware, intrusion attempts, and anomalous behavior. Threat detection tests can use techniques such as anomaly detection algorithms to identify potential security incidents. Remediation action tests can evaluate the AI model's capability to mitigate and address security incidents or breaches effectively. The application domain assesses the AI model's response procedures, incident management protocols, and resilience mechanisms. Examples of remediation actions include automated incident response, backup and recovery strategies, and incident reporting mechanisms to facilitate timely resolution of security incidents and minimal impact.

The system can, in some implementations, score an AI model's detection of dependencies within the AI model's training data by evaluating how well the AI model identifies and manages relationships between different components, data sources, or processes the AI model relies on. For example, a higher score can be awarded if the AI model has a higher accuracy in detecting dependencies within data. Additionally or alternatively, the system can score an AI model's ability to handle dependency failures or conflicts. For example, if an external API used by the AI model becomes unavailable, a higher score can be assigned to AI models that switch to a backup source or notify system administrators to address the issue (e.g., AI models that include actions to minimize disruption).

In act 1108, using the determined set of layers, the system dynamically evaluates the pre-trained LLM against the corresponding sets of benchmarks for the set of layers using a set of assessments, wherein each assessment of the set of assessments comprises: (1) a layered prompt associated with a set of one or more layers of the set of layers and (2) a layer-specific expected response of the layered prompt.

For each assessment, the system supplies the layered prompt of the assessment into the pre-trained LLM. The layered prompt tests the corresponding degree of satisfaction of the pre-trained LLM with the one or more guidelines associated with the corresponding layer. The prompts provide inputs to the LLM under assessment and cause the LLM to generate a layer-specific model response that demonstrates its satisfaction (or lack thereof) with the guidelines. In some implementations, prompts represent real-world scenarios. In some implementations, the prompt can specify the guidelines to be considered when generating the expected response. For example, when the prompt is a question related to whether a certain action complies with organizational regulations, the prompt indicates to the system to select/target guidelines defined by the organizational regulations. The prompt from the assessment operates as a command set, which operates as the input for the LLM. Once the command set/prompt is generated, the prompt is used as input for the LLM, which processes the commands and generates a response using the LLM's internal decision-making processes. The expected response of each test can include an expected outcome and an expected explanation of how the expected outcome was determined. Each assessment evaluates (e.g., tests) the degree of satisfaction of the pre-trained LLM with one or more guidelines associated with the corresponding application domain. For example, to evaluate an LLM's compliance with regulatory guidelines, the prompt can be a simulated scenario that asks the LLM to generate an outcome (e.g., "Given XYZ, should this loan application be approved?").

The prompts in each assessment can vary in complexity, ranging from simple queries to more complex scenarios designed to test various aspects of the model's performance. For example, if the guideline is to evaluate the model's ability to classify customer feedback accurately, a prompt can include a few sentences of feedback that need classification. The input data in this case would be the text of the feedback itself. The model's response is then compared against expected outcomes to determine if it meets the standards set by the guideline analysis. In another example where the prompt is more complex, the prompt can simulate a series of network activities and ask the LLM to identify potential security threats. This prompt requires the model to process various data points and make a comprehensive assessment. The input data includes logs of network activity, such as timestamps, IP addresses, and types of actions performed. In some implementations, when creating the prompt, the system can validate that the input data used in the prompts does not inadvertently introduce bias in the LLM's response. For example, if the model is being tested on its ability to make loan approval decisions, including a variable like the applicant's first name should not affect the outcome. If the results vary significantly based on names that suggest different genders or ethnic backgrounds, this could indicate a bias that needs to be addressed.

One or more layered prompts of one or more assessments in the set of assessments can modify one variable of the corresponding set of variables for the corresponding one or more layers and maintain other variables of the corresponding set of variables as constant. This method allows for a focused assessment of the LLM's performance concerning a particular variable. By isolating a single variable and adjusting the variable within the layered prompt, the system can determine the impact of that particular variable on the LLM's responses, without interference from other attributes. For example, when testing for ethical compliance, each layered prompts' context and complexity may remain the same while adjusting for one variable (e.g., ethnicity) that assesses the LLM's ability to avoid biased language. The targeted assessment can reveal specific strengths or weaknesses in the LLM's decision-making process.

Using the received layer-specific model response, the system compares the layer-specific expected response of the assessment to the layer-specific model response received from the pre-trained LLM. Subsequent assessments of the set of assessments occurring subsequent to previous assessments of the set of assessments are dynamically constructed using the comparison of the layer-specific expected response of the previous assessments to the layer-specific model response received from the pre-trained LLM for the previous assessments.

For example, to construct the assessments, the system can first assess both the current and target requirements or guidelines (e.g., jurisdictional, organizational, AI-type specific). In a financial context, the system can identify existing financial regulations, frameworks, and technologies in use, alongside defining the desired financial posture aligned with organizational goals, regulatory standards, and industry best practices. The system can identify any gaps or deficiencies between the current and target requirements or guidelines. For example, in a cybersecurity context, gaps can encompass areas such as network security, data protection measures, access controls, and/or incident response protocols. Once the system understands the gaps, the system can prioritize the layers used within the assessments (e.g., by adjusting the weights of particular layers, by omitting or including certain layers). For example, layers can be ranked based on their relevance to the organization's mission, legal and regulatory requirements, and/or risk management expectations. Moreover, the system can continuously monitor and track progress toward addressing the identified gaps to adjust the layers (e.g., by adjusting the weights of particular layers, by omitting or including certain layers) to reduce the identified gaps.

In some implementations, the gap can be identified using a machine learning model trained on labeled training data to learn patterns and relationships between features and guideline sources. For example, the labeled training data can be sets of guidelines based on the type of guideline they belong to (e.g., current guideline, target guideline). Using the trained model, the system can use the trained model to identify differences between the sets of guidelines by analyzing the features that contribute most to the classification decision (e.g., current guideline, target guideline) of each set of guidelines and identifying areas of divergence or overlap between the guidelines.

To evaluate the Al application's response, the system can quantify a degree of similarity between 1) the layer-specific expected response of the particular assessment and 2) the layer-specific model response received from the LLM. In some implementations, the system can adjust the predefined threshold for similarity based on specific requirements and the complexity of the guidelines being evaluated. For instance, guidelines with stringent compliance requirements may warrant a higher similarity threshold to ensure a more rigorous assessment. The system can use semantic search techniques through natural language processing (NLP) algorithms to understand the meaning and context of the explanations and outcomes of the LLM and compare the response of the LLM with the expected response of the particular assessment. In some implementations, the textual data in the response of the LLM can be tokenized by words, phrases, and/or characters. For example, in the sentence "The quick brown fox jumped," the word tokens would be "The," "quick," "brown," "fox," and "jumped." In some implementations, the textual data in the response of the LLM can be broken down into vector representations of the alphanumeric characters. Once the textual data is vectorized, the system can extract the semantic meaning of each vector and understand the vector's context within the sentence and document. For example, word embedding models (e.g., Word2Vec, GloVe) can be used to capture the semantic relationships between words and phrases. The models can map words to high-dimensional vector representations, where similar words are closer together in vector space.

The semantic representations of the LLM's response are compared with the expected response specified in the particular assessment. The grading engine can align the vector representations of the tokens in the LLM's response with those of the expected response. The grading engine identifies similarities and differences between the two sets of vector representations, highlighting areas where the LLM's behavior diverges from the expected response specified in the particular assessment. Similarity metrics, such as cosine similarity or Jaccard similarity, can be used to quantify the similarity between the LLM's behavior and the expected responses. For example, cosine similarity can measure the cosine of the angle between two vector representations in vector space, whereas Jaccard similarity can measure the similarity between sets of tokens (e.g., the set of tokens of the response of the LLM, and the set of tokens of the expected response specified in the particular assessment) by comparing the intersection and union of the tokens within each set and quantify the degree of overlap or similarity between the sets based on their shared vocabulary. The similarity metrics provide numerical measures of how closely the LLM's behavior aligns with the expected response specified in the particular assessment, providing quantitative assessments of the degree of satisfaction.

In some implementations, such as when testing for Al explainability, the system first compares the expected outcome of the particular assessment to the case-specific outcome received from the pre-trained LLM. Responsive to the expected outcome of the particular assessment satisfying the case-specific outcome received from the pre-trained LLM, the system can compare the expected explanation of the particular assessment to the corresponding case-specific explanation of the case-specific outcome. In some implementations, the metadata from the assessments are stored in a database so that the metadata from subsequent assessments can be compared with metadata from previous assessments.

In some implementations, the system evaluates the LLM's capacity to follow instructions and generate outputs with specific qualities, and/or demonstrate an understanding of context and logical reasoning. For example, a model designed for customer service should not only provide accurate answers but also maintain a conversational tone, handle follow-up questions, and adapt to various customer needs. The system can evaluate these capabilities by testing the model in scenarios that mimic real-world interactions. For example, to test an LLM's ability to follow instructions, an LLM can be asked to generate a report based on specific information, such as real-world events and the system can evaluate the accurateness of the report received from the LLM. Additionally, the system can test an LLM's understanding by providing inputs that require nuanced responses (e.g., asking the LLM to offer tailored advice based on a particular financial situation and goals).

In some implementations, the layer-specific model response of the LLM includes a layer-specific model outcome and a layer-specific model explanation of how the layer-specific model outcome was determined. The layer-specific expected response of each assessment can include a layer-specific expected outcome and a layer-specific expected explanation of how the layer-specific expected outcome was determined. The system compares the layer-specific expected response of a particular assessment to the layer-specific model response received from the LLM. The comparison can include comparing the layer-specific expected outcome of the particular assessment to the layer-specific model outcome received from the LLM. Responsive to the layer-specific expected outcome of the particular assessment satisfying the layer-specific model outcome received from the LLM, the system can compare the layer-specific expected explanation of the particular assessment to the corresponding layer-specific model explanation of the layer-specific model outcome.

The system can store the set of assessments for each layer in the set of layers in a vector space representation. The set of assessments can be stored in a structured format. Methods of storing the set of assessments in a vector space representation are the same as or similar to storing layers 404a-n in vector store 402 with reference to FIG. 4.

In act 1110, using the dynamic evaluation of the pre-trained LLM, the system assigns a score, for each layer, to the pre-trained LLM. For each assessment, the system compares the layer-specific expected response of the assessment to the layer-specific model response received from the pre-trained LLM. Using the comparisons, the system determines a particular degree of satisfaction of the AI model with the one or more guidelines associated with the corresponding assessment, in accordance with the set of benchmarks for the corresponding layer.

The degree of satisfaction indicates how well the LLM meets the predefined guidelines and benchmarks for each assessment. The degree of satisfaction represents the extent to which the LLM's performance aligns with the expected outcomes specified in the guidelines tested in the assessment. The degree of satisfaction can be expressed in various forms, including binary indicators (e.g., pass/fail), categorical ratings (e.g., "Excellent," "Good," "Fair," "Poor"), raw measurements, and/or probabilistic values (e.g., a confidence percentage). The binary indicator can indicate whether the LLM meets the specified criteria (e.g., compliance with cybersecurity measures) or fails to do so (e.g., scores 1008, 1010 in FIG. 10). A categorical indicator reflects the overall performance of the LLM in meeting the criteria established for that particular category. For example, indicators may be categorized as "Excellent," "Good," "Fair," or "Poor," based on the degree of satisfaction demonstrated by the LLM for the assessments in the layer. A probability-based indicator provides a quantitative measure of confidence in the degree of satisfaction. The probability indicates the likelihood that the pre-trained LLM's performance aligns with the specified benchmarks for the layer. In some implementations, the measurements taken from the assessment results are used as the degrees of satisfaction themselves. In some implementations, in response to reaching a non-compliance threshold indicating an absence of adherence to the set of guidelines, the system can prevent additional assessments to preserve computing resources.

The assigned score can correspond to the one or more layers of the pre-trained LLM that includes a binary indicator of the particular degree of satisfaction, a category of the particular degree of satisfaction, and/or a probability of the particular degree of satisfaction. The assigned score is a quantitative value that represents the LLM's performance in a standardized manner by aggregating the degrees of satisfaction for different assessments in the layer. The assigned score reflects how well the LLM satisfies the benchmarks associated with each layer. For example, the degrees of satisfaction may be a p-value for one assessment, and "Pass" for a different assessment. The assigned score can be a predefined format of a categorical indicator "A," which indicates the degree of satisfaction of the assessments within the layer. For example, an LLM might receive a score of 85 out of 100, indicating a high degree of satisfaction with the guidelines, whereas a lower score would indicate areas needing improvement.

In act 1112, the system generates for display at the GUI, a graphical layout indicating the assigned scores, wherein the graphical layout includes a first graphical representation of each layer of the set of layers and a second graphical representation of the corresponding assigned score for each layer of the set of layers. This could be displayed as a numerical value, a color-coded system, or other visual indicators such as bars or graphs, providing visual way to gauge the LLM's performance. For instance, a high score might be represented in green, while lower scores might be shown in yellow or red, allowing for at-a-glance interpretation of the LLM's strengths and weaknesses.

The system can assign a weight to each layer within the set of layers of the AI model. Using the assigned scores, the system can generate an overall score indicating satisfaction with one or more operation boundaries of the corresponding guidelines of the set of layers in accordance with the assigned weight of each layer within the set of layers. In some implementations, the second graphical representation indicates the one or more layers of the set of layers, the corresponding sets of variables of the one or more layers, and/or predetermined weights used for each layer of the one or more layers. By showing how different layers and their associated variables are weighted, the graphical layout helps users comprehend how the final scores are derived and the significance of each layer in the overall assessment. This transparency ensures that users are able to understand the evaluation process and make informed decisions based on the displayed scores.

Using the assigned scores of the AI model, the system generates a set of actions (e.g., a modification plan) configured to adjust the assigned scores to a set of desired scores. Implementing the modification plan can increase the degree of satisfaction of the AI model with the operation boundaries in the set of guidelines. The set of actions constructed can be categorized based on a type of the assigned scores. The type of the assigned scores can include one or more of: complete alignment, partial alignment, or misalignment. The system can identify the root cause of the difference between the set of assigned scores and the desired set of scores. For example, the desired set of scores can be higher than the actual assigned scores. The system then parses through the degrees of satisfaction for each assessment and identifies potential discrepancies to map to corrective actions. The corrective actions can be preloaded into the system.

In some implementations, the system receives a subset of layers within the set of layers. The system can present a subset of the assigned scores using a particular view scope. The particular view scope can filter the set of assigned scores using the subset of layers. For example, an AI model can be tested on a variety of general layers, but users may choose to only focus on layers related to data quality. The users can then choose to only view the view scope including the selected layers. In some implementations, in addition to an overall score, there can be corresponding layer-specific scores (e.g., layer scores 1016*a-c*, 1018*a-c*) included in each view scope.

AI System

Figure 12:
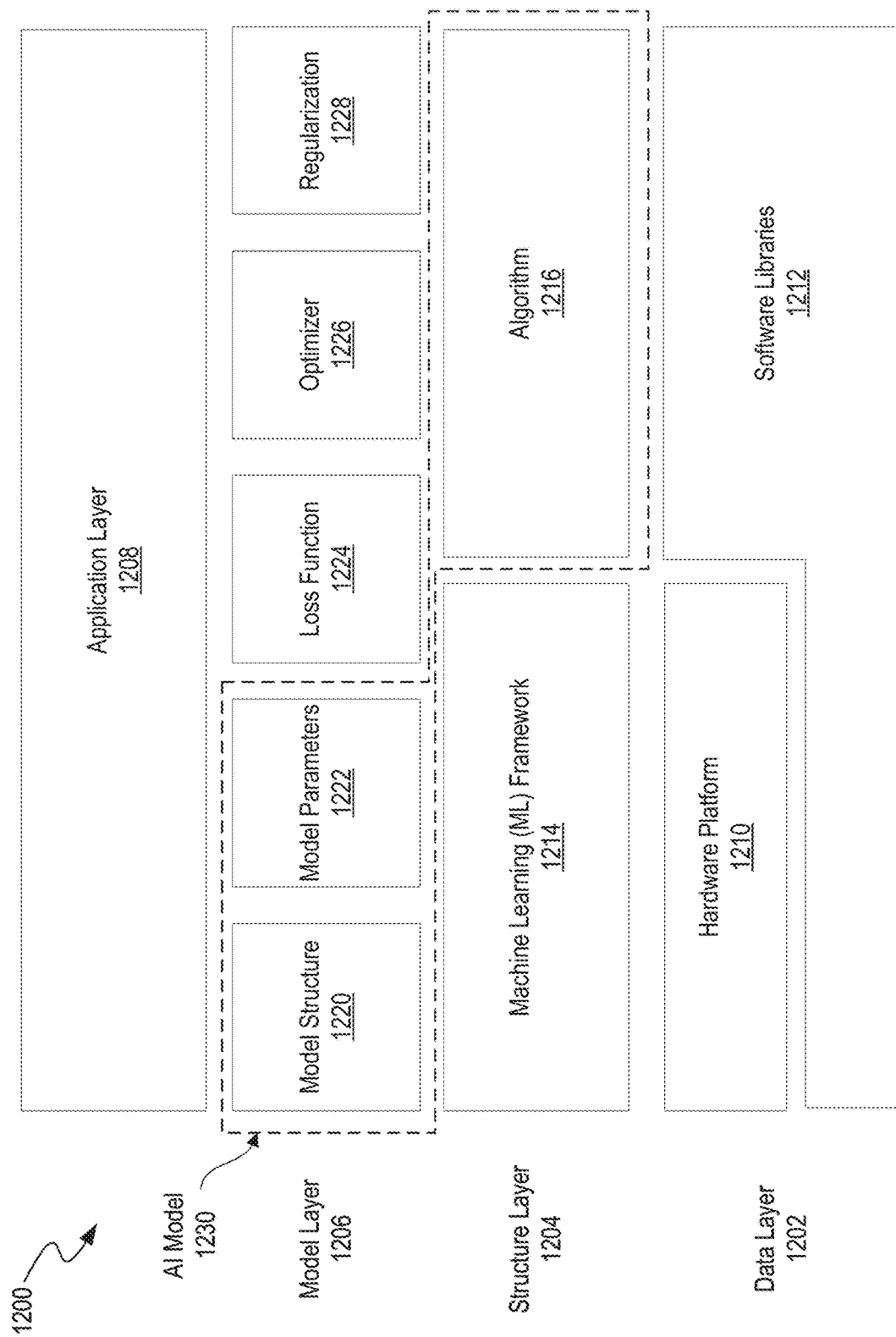
FIG. 12 is a high-level block diagram illustrating an example AI system, in accordance with one or more implementations.

FIG. 12 is a block diagram illustrating an example artificial intelligence (AI) system 1200, in accordance with one or more implementations of this disclosure. The AI system 1200 is implemented using components of the example computer system 1300 illustrated and described in more detail with reference to FIG. 13. For example, the AI system 1200 can be implemented using the processor 1302 and instructions 1308 programmed in the memory 1306 illustrated and described in more detail with reference to FIG. 13. Likewise, implementations of the AI system 1200 can include different and/or additional components or be connected in different ways.

As shown, the AI system 1200 can include a set of layers, which conceptually organize elements within an example network topology for the AI system's architecture to implement a particular AI model 1230. Generally, an AI model 1230 is a computer-executable program implemented by the AI system 1200 that analyzes data to make predictions. Information can pass through each layer of the AI system 1200 to generate outputs for the AI model 1230. The layers can include a data layer 1202, a structure layer 1204, a model layer 1206, and an application layer 1208. The algorithm 1216 of the structure layer 1204 and the model structure 1220 and model parameters 1222 of the model layer 1206 together form the example AI model 1230. The optimizer 1226, loss function engine 1224, and regularization engine 1228 work to refine and optimize the AI model 1230, and the data layer 1202 provides resources and support for application of the AI model 1230 by the application layer 1208.

The data layer 1202 acts as the foundation of the AI system 1200 by preparing data for the AI model 1230. As shown, the data layer 1202 can include two sub-layers: a hardware platform 1210 and one or more software libraries 1212. The hardware platform 1210 can be designed to perform operations for the AI model 1230 and include computing resources for storage, memory, logic, and networking, such as the resources described in relation to FIG. 13. The hardware platform 1210 can process amounts of data using one or more servers. The servers can perform backend operations such as matrix calculations, parallel calculations, machine learning (ML) training, and the like. Examples of servers used by the hardware platform 1210 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 1210 can include Infrastructure as a Service (IaaS) resources, which are computing resources, (e.g., servers, memory, etc.) offered by a cloud services provider. The hardware platform 1210 can also include computer memory for storing data about the AI model 1230, application of the AI model 1230, and training data for the AI model 1230. The computer memory can be a form of random-access memory (RAM), such as dynamic RAM, static RAM, and non-volatile RAM.

The software libraries 1212 can be thought of as suites of data and programming code, including executables, used to control the computing resources of the hardware platform 1210. The programming code can include low-level primitives (e.g., fundamental language elements) that form the foundation of one or more low-level programming languages, such that servers of the hardware platform 1210 can use the low-level primitives to carry out specific operations. The low-level programming languages do not require much, if any, abstraction from a computing resource's instruction set architecture, allowing them to run quickly with a small memory footprint. Examples of software libraries 1212 that can be included in the AI system 1200 include Intel Math Kernel Library, Nvidia cuDNN, Eigen, and Open BLAS.

The structure layer 1204 can include a machine learning (ML) framework 1214 and an algorithm 1216. The ML framework 1214 can be thought of as an interface, library, or tool that allows users to build and deploy the AI model 1230. The ML framework 1214 can include an open-source library, an application programming interface (API), a gradient-boosting library, an ensemble method, and/or a deep learning toolkit that work with the layers of the AI system facilitate development of the AI model 1230. For example, the ML framework 1214 can distribute processes for application or training of the AI model 1230 across multiple resources in the hardware platform 1210. The ML framework 1214 can also include a set of pre-built components that have the functionality to implement and train the AI model 1230 and allow users to use pre-built functions and classes to construct and train the AI model 1230. Thus, the ML framework 1214 can be used to facilitate data engineering, development, hyperparameter tuning, testing, and training for the AI model 1230.

Examples of ML frameworks 1214 or libraries that can be used in the AI system 1200 include TensorFlow, PyTorch, Scikit-Learn, Keras, and Cafffe. Random Forest is a machine learning algorithm that can be used within the ML frameworks 1214. LightGBM is a gradient boosting framework/algorithm (an ML technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying ML models.

In some implementations, the ML framework 1214 performs deep learning (also known as deep structured learning or hierarchical learning) directly on the input data to learn data representations, as opposed to using task-specific algorithms. In deep learning, no explicit feature extraction is performed; the features of feature vector are implicitly extracted by the AI system 1200. For example, the ML framework 1214 can use a cascade of multiple layers of nonlinear processing units for implicit feature extraction and transformation. Each successive layer uses the output from the previous layer as input. The AI model 1230 can thus learn in supervised (e.g., classification) and/or unsupervised (e.g., pattern analysis) modes. The AI model 1230 can learn multiple levels of representations that correspond to different levels of abstraction, wherein the different levels form a hierarchy of concepts. In this manner, AI model 1230 can be configured to differentiate features of interest from background features.

The algorithm 1216 can be an organized set of computer-executable operations used to generate output data from a set of input data and can be described using pseudocode. The algorithm 1216 can include complex code that allows the computing resources to learn from new input data and create new/modified outputs based on what was learned. In some implementations, the algorithm 1216 can build the AI model 1230 through being trained while running computing resources of the hardware platform 1210. The training allows the algorithm 1216 to make predictions or decisions without being explicitly programmed to do so. Once trained, the algorithm 1216 can run at the computing resources as part of the AI model 1230 to make predictions or decisions, improve computing resource performance, or perform tasks. The algorithm 1216 can be trained using supervised learning, unsupervised learning, semi-supervised learning, and/or reinforcement learning.

Using supervised learning, the algorithm 1216 can be trained to learn patterns (e.g., map input data to output data) based on labeled training data. The training data can be labeled by an external user or operator. The user can label the training data based on one or more classes and trains the AI model 1230 by inputting the training data to the algorithm 1216. The algorithm determines how to label the new data based on the labeled training data. The user can facilitate collection, labeling, and/or input via the ML framework 1214. In some instances, the user can convert the training data to a set of feature vectors for input to the algorithm 1216. Once trained, the user can test the algorithm 1216 on new data to determine if the algorithm 1216 is predicting accurate labels for the new data. For example, the user can use cross-validation methods to test the accuracy of the algorithm 1216 and retrain the algorithm 1216 on new training data if the results of the cross-validation are below an accuracy threshold.

Supervised learning can involve classification and/or regression. Classification techniques involve teaching the algorithm 1216 to identify a category of new observations based on training data and are used when input data for the algorithm 1216 is discrete. Said differently, when learning through classification techniques, the algorithm 1216 receives training data labeled with categories (e.g., classes) and determines how features observed in the training data relate to the categories. Once trained, the algorithm 1216 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1216 is continuous. Regression techniques can be used to train the algorithm 1216 to predict or forecast relationships between variables. To train the algorithm 1216 using regression techniques, a user can select a regression method for estimating the parameters of the model. The user collects and labels training data that is input to the algorithm 1216 such that the algorithm 1216 is trained to understand the relationship between data features and the dependent variable(s). Once trained, the algorithm 1216 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1216 learns patterns from unlabeled training data. In particular, the algorithm 1216 is trained to learn hidden patterns and insights of input data, which can be used for data exploration or for generating new data. Here, the algorithm 1216 does not have a predefined output, unlike the labels output when the algorithm 1216 is trained using supervised learning. Another way unsupervised learning is used to train the algorithm 1216 to find an underlying structure of a set of data is to group the data according to similarities and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 1216 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1216 can be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 1216 include factor analysis, item response theory, latent profile analysis, and latent class analysis.

In some implementations, the AI system 1200 trains the algorithm 1216 of AI model 1230, based on the training data, to correlate the feature vector to expected outputs in the training data. As part of the training of the AI model 1230, the AI system 1200 forms a training set of features and training labels by identifying a positive training set of features that have been determined to have a desired property in question, and, in some implementations, forms a negative training set of features that lack the property in question. The AI system 1200 applies ML framework 1214 to train the AI model 1230, that when applied to the feature vector, outputs indications of whether the feature vector has an associated desired property or properties, such as a probability that the feature vector has a particular Boolean property, or an estimated value of a scalar property. The AI system 1200 can further apply dimensionality reduction (e.g., via linear discriminant analysis (LDA), PCA, or the like) to reduce the amount of data in the feature vector to a smaller, more representative set of data.

The model layer 1206 implements the AI model 1230 using data from the data layer and the algorithm 1216 and ML framework 1214 from the structure layer 1204, thus enabling decision-making capabilities of the AI system 1200. The model layer 1206 includes a model structure 1220, model parameters 1222, a loss function engine 1224, an optimizer 1226, and a regularization engine 1228.

The model structure 1220 describes the architecture of the AI model 1230 of the AI system 1200. The model structure 1220 defines the complexity of the pattern/relationship that the AI model 1230 expresses. Examples of structures that can be used as the model structure 1220 include decision trees, support vector machines, regression analyses, Bayesian networks, Gaussian processes, genetic algorithms, and artificial neural networks (or, simply, neural networks). The model structure 1220 can include a number of structure layers, a number of nodes (or neurons) at each structure layer, and activation functions of each node. Each node's activation function defines how to node converts data received to data output. The structure layers can include an input layer of nodes that receive input data, an output layer of nodes that produce output data. The model structure 1220 can include one or more hidden layers of nodes between the input and output layers. The model structure 1220 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1222 represent the relationships learned during training and can be used to make predictions and decisions based on input data. The model parameters 1222 can weight and bias the nodes and connections of the model structure 1220. For example, when the model structure 1220 is a neural network, the model parameters 1222 can weight and bias the nodes in each layer of the neural networks, such that the weights determine the strength of the nodes and the biases determine the thresholds for the activation functions of each node. The model parameters 1222, in conjunction with the activation functions of the nodes, determine how input data is transformed into desired outputs. The model parameters 1222 can be determined and/or altered during training of the algorithm 1216.

The loss function engine 1224 can determine a loss function, which is a metric used to evaluate the AI model's 1230 performance during training. For example, the loss function engine 1224 can measure the difference between a predicted output of the AI model 1230 and the actual output of the AI model 1230 and is used to guide optimization of the AI model 1230 during training to minimize the loss function. The loss function can be presented via the ML framework 1214, such that a user can determine whether to retrain or otherwise alter the algorithm 1216 if the loss function is over a threshold. In some instances, the algorithm 1216 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1226 adjusts the model parameters 1222 to minimize the loss function during training of the algorithm 1216. In other words, the optimizer 1226 uses the loss function generated by the loss function engine 1224 as a guide to determine what model parameters lead to the most accurate AI model 1230. Examples of optimizers include Gradient Descent (GD), Adaptive Gradient Algorithm (Ada-Grad), Adaptive Moment Estimation (Adam), Root Mean Square Propagation (RMSprop), Radial Base Function (RBF) and Limited-memory BFGS (L-BFGS). The type of optimizer 1226 used can be determined based on the type of model structure 1220 and the size of data and the computing resources available in the data layer 1202.

The regularization engine 1228 executes regularization operations. Regularization is a technique that prevents over- and under-fitting of the AI model 1230. Overfitting occurs when the algorithm 1216 is overly complex and too adapted to the training data, which can result in poor performance of the AI model 1230. Underfitting occurs when the algorithm 1216 is unable to recognize even basic patterns from the training data such that it cannot perform well on training data or on validation data. The regularization engine 1228 can apply one or more regularization techniques to fit the algorithm 1216 to the training data properly, which helps constraint the resulting AI model 1230 and improves its ability for generalized application. Examples of regularization techniques include lasso (L1) regularization, ridge (L2) regularization, and elastic (L1 and L2 regularization).

In some implementations, the AI system 1200 can include a feature extraction module implemented using components of the example computer system 1300 illustrated and described in more detail with reference to FIG. 13. In some implementations, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 1230 by using the reduced representation. In some example implementations, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semi-definite embedding, autoencoder, and deep feature synthesis.

Computer System

Figure 13:
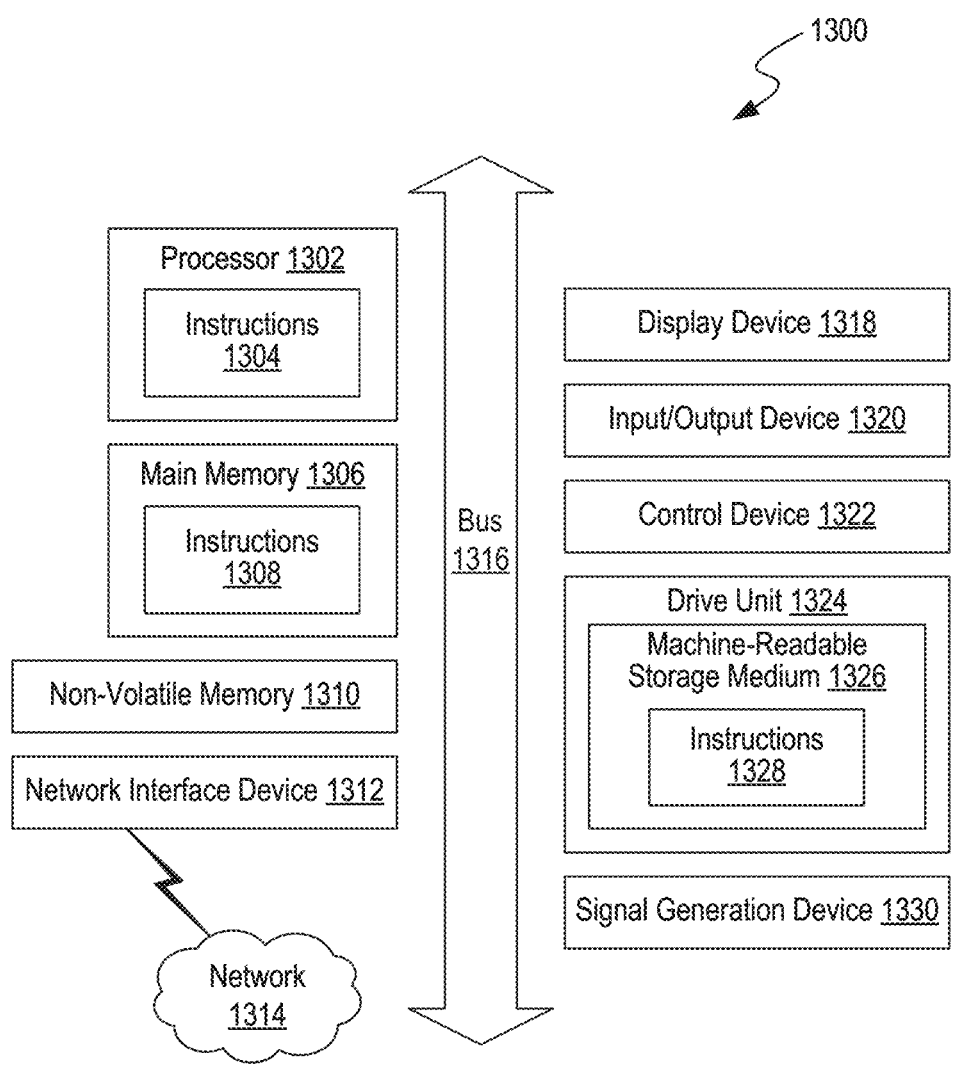
FIG. 13 is a block diagram illustrating an example computer system, in accordance with one or more implementations.

FIG. 13 is a block diagram that illustrates an example of a computer system 1300 in which at least some operations described herein can be implemented. As shown, the computer system 1300 can include: one or more processors 1302, main memory 1306, non-volatile memory 1310, a network interface device 1312, a video display device 1318, an input/output device 1320, a control device 1322 (e.g., keyboard and pointing device), a drive unit 1324 that includes a machine-readable (storage) medium 1326, and a signal generation device 1330 that are communicatively connected to a bus 1316. The bus 1316 represents one or more physical buses and/or point-to-point connections that are connected by appropriate bridges, adapters, or controllers. Various common components (e.g., cache memory) are omitted from FIG. 13 for brevity. Instead, the computer system 1300 is intended to illustrate a hardware device on which components illustrated or described relative to the examples of the figures and any other components described in the specification can be implemented.

The computer system 1300 can take any suitable physical form. For example, the computing system 1300 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1300. In some implementations, the computer system 1300 can be an embedded computer system, a system-on-chip (SOC), a single-board computer system (SBC), or a distributed system such as a mesh of computer systems, or it can include one or more cloud components in one or more networks. Where appropriate, one or more computer systems 1300 can perform operations in real time, in near real time, or in batch mode.

The network interface device 1312 enables the computing system 1300 to mediate data in a network 1314 with an entity that is external to the computing system 1300 through any communication protocol supported by the computing system 1300 and the external entity. Examples of the network interface device 1312 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1306, non-volatile memory 1310, machine-readable medium 1326) can be local, remote, or distributed. Although shown as a single medium, the machine-readable medium 1326 can include multiple media (e.g., a centralized/distributed database and/or associated caches and servers) that store one or more sets of instructions 1328. The machine-readable medium 1326 can include any medium that is capable of storing, encoding, or carrying a set of instructions for execution by the computing system 1300. The machine-readable medium 1326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite the change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1304, 1308, 1328) set at various times in various memory and storage devices in computing device(s). When read and executed by the processor 1302, the instruction(s) cause the computing system 1300 to perform operations to execute elements involving the various aspects of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A method for evaluating and assessing performance of pre-trained large language models using layered assessments via a graphical user interface (GUI), the method comprising:

obtaining a set of application domains of a pre-trained large language model (LLM) in which the pre-trained LLM will be used,
    wherein the pre-trained LLM is configured to generate, in response to a received input, a response;

using the set of application domains, obtaining a set of guidelines defining one or more operation boundaries of the pre-trained LLM, determining a set of layers for the pre-trained LLM associated with one or more guidelines of the set of guidelines,
    wherein each layer within the set of layers is mapped to: (1) a set of variables associated with the one or more guidelines of each corresponding layer and (2) a set of benchmarks associated with the one or more guidelines of each corresponding layer,
    wherein each variable in the set of variables represents an attribute identified within the one or more guidelines of each corresponding layer, and
    wherein each benchmark in the set of benchmarks is configured to indicate a degree of satisfaction of the pre-trained LLM with the one or more guidelines associated with the corresponding layer;

using the determined set of layers, dynamically evaluating the pre-trained LLM against the corresponding sets of benchmarks for the set of layers using a set of assessments, wherein each assessment of the set of assessments comprises (1) a layered prompt associated with a set of one or more layers of the set of layers and (2) a layer-specific expected response of the layered prompt, by, for each assessment:

supplying the layered prompt of the assessment into the pre-trained LLM,
wherein the layered prompt is configured to test the corresponding degree of satisfaction of the pre-trained LLM with the one or more guidelines associated with the corresponding layer,
responsive to inputting the layered prompt, receiving, from the pre-trained LLM, a layer-specific model response, and
using the received layer-specific model response, comparing the layer-specific expected response of the assessment to the layer-specific model response received from the pre-trained LLM,
wherein subsequent assessments of the set of assessments occurring subsequent to previous assessments of the set of assessments are dynamically constructed using the comparison of the layer-specific expected response of the previous assessments to the layer-specific model response received from the pre-trained LLM for the previous assessments;
using the dynamic evaluation of the pre-trained LLM, assigning a score, for each layer, to the pre-trained LLM, by:
for each assessment, comparing the layer-specific expected response of the assessment to the layer-specific model response received from the pre-trained LLM, and
using the comparisons, determining a particular degree of satisfaction of the pre-trained LLM with the one or more guidelines associated with the corresponding assessment, in accordance with the set of benchmarks for the corresponding layer; and
generating for display at the GUI, a graphical layout indicating the assigned scores, wherein the graphical layout includes a first graphical representation of each layer of the set of layers and a second graphical representation of the corresponding assigned score for each layer of the set of layers.

2. The method of claim 1, further comprising:
receiving an indicator of a type of application associated with the pre-trained LLM,
identifying a relevant set of layers associated with the type of the application defining the one or more operation boundaries of the pre-trained LLM, and
obtaining the relevant set of layers, via an Application Programming Interface (API).

3. The method of claim 1,
wherein one or more of the layers within the set of layers relates to a quality of training data of the pre-trained LLM, and
wherein the corresponding set of tests relates to one or more of:
a presence of bias within the training data,
a presence of structured metadata in the training data, or
a presence of outliers in the training data.

4. The method of claim 3, wherein one or more layered prompts of one or more assessments in the set of assessments modify one variable of the corresponding set of variables for the corresponding one or more layers and maintain other variables of the corresponding set of variables as constant.

5. The method of claim 4, wherein the second graphical representation indicates one or more of:
the one or more layers of the set of layers,
the corresponding sets of variables of the one or more layers, or
predetermined weights used for each layer of the one or more layers.

6. The method of claim 1, wherein the assigned scores corresponding to the one or more layers of the pre-trained LLM includes one or more of:
a binary indicator of the particular degree of satisfaction,
a category of the particular degree of satisfaction, or
a probability of the particular degree of satisfaction.

7. The method of claim 1, wherein the set of layers is an LLM-specific set of layers, further comprising:
receiving an input indicative of an overall set of layers and the set of variables for each layer of the overall set of layers;
using an ML model, comparing the application domains within the overall set of layers with the obtained application domains related to the pre-trained LLM;
extracting the LLM-specific set of layers from the overall set of layers using the comparison.

8. A non-transitory, computer-readable storage medium storing instructions for evaluating and assessing performance of an artificial intelligence (AI) model using layered assessments, wherein the instructions when executed by at least one data processor of a system, cause the system to:
determine a set of layers for the AI model associated with one or more guidelines defining one or more operation boundaries of the AI model,
wherein each layer within the set of layers is mapped to: (1) a set of variables associated with the one or more guidelines of each corresponding layer and (2) a set of benchmarks associated with the one or more guidelines of each corresponding layer,
wherein each variable in the set of variables represents an attribute identified within the one or more guidelines of each corresponding layer, and
wherein each benchmark in the set of benchmarks is configured to indicate a degree of satisfaction of the AI model with the one or more guidelines associated with the corresponding layer;
using the determined set of layers, dynamically evaluate the AI model against the corresponding sets of benchmarks for the set of layers using a set of assessments, wherein each assessment of the set of assessments comprises: (1) a layered prompt associated with a set of one or more layers of the set of layers and (2) a layer-specific expected response of the layered prompt, by, for each assessment:
supplying the layered prompt of the assessment into the AI model,
wherein the layered prompt is configured to test the corresponding degree of satisfaction of the AI model with the one or more guidelines associated with the corresponding layer,
responsive to inputting the layered prompt, receiving, from the AI model, a layer-specific model response, and
using the received layer-specific model response, comparing the layer-specific expected response of the assessment to the layer-specific model response received from the AI model,
wherein subsequent assessments of the set of assessments occurring subsequent to previous assessments of the set of assessments are dynamically constructed using the comparison of the layer-specific expected response of the previous assessments to the layer-specific model response received from the AI model for the previous assessments; and
using the dynamic evaluation of the AI model, assign a score, for each layer, to the AI model, by:
for each assessment, comparing the layer-specific expected response of the assessment to the layer-specific model response received from the AI model, and
using the comparisons, determining a particular degree of satisfaction of the AI model with the one or more guidelines associated with the corresponding assessment, in accordance with the set of benchmarks for the corresponding layer.

9. The non-transitory, computer-readable storage medium of claim 8, wherein the instructions further cause the system to:
using the assigned scores of the AI model, generate a set of actions configured to adjust the assigned scores to a set of desired scores,
wherein the set of actions constructed is categorized based on a type of the assigned scores,
wherein the type of the assigned scores includes one or more of: complete alignment, partial alignment, or misalignment.

10. The non-transitory, computer-readable storage medium of claim 8, wherein the instructions further cause the system to:
assign a weight to each layer within the set of layers of the AI model; and
using the assigned scores, generate an overall score indicating satisfaction with the one or more operation boundaries of the corresponding guidelines of the set of layers in accordance with the assigned weight of each layer within the set of layers.

11. The non-transitory, computer-readable storage medium of claim 8,
wherein the set of layers is dynamically determined by an machine learning (ML) model by:
determining a set of application domains of the AI model in which the AI model will be used, and
using the set of application domains, identifying the set of guidelines defining the one or more operation boundaries of the AI model.

12. The non-transitory, computer-readable storage medium of claim 8,
wherein the set of layers is determined by a received input,
wherein the received input indicates a set of application domains of the AI model in which the AI model will be used.

13. The non-transitory, computer-readable storage medium of claim 8,
wherein one or more of the layers within the set of layers relates to attempts to access data,
wherein the corresponding set of variables relate to one or more of:
an author associated with the attempt,
a timestamp associated with the attempt,
a location associated with the attempt,
a presence of an authorization related to the attempt,
previous unsuccessful attempts to access the data, or
frequency of the attempts.

14. The non-transitory, computer-readable storage medium of claim 8, wherein the instructions further cause the system to:
determine the set of guidelines, via a machine learning (ML) model, using one or more of:
a location of the AI model,
a use case of the AI model, or
data sources used in the AI model.

15. A system comprising:
at least one hardware processor; and
at least one non-transitory memory storing instructions, which, when executed by the at least one hardware processor, cause the system to:
map a set of layers for an artificial intelligence (AI) model associated with one or more guidelines defining one or more operation boundaries of the AI model to: (1) a set of variables and (2) a set of benchmarks,
wherein each variable in the set of variables represents an attribute identified within the one or more guidelines of each corresponding layer, and
wherein each benchmark in the set of benchmarks is configured to indicate a degree of satisfaction of the AI model with the one or more guidelines associated with the corresponding layer;
using the mapped set of layers, evaluate the AI model against the corresponding sets of benchmarks for the set of layers using a set of assessments by, for each assessment:
supplying a layered prompt of the assessment into the AI model,
wherein the layered prompt is configured to test the corresponding degree of satisfaction of the AI model with the one or more guidelines associated with the corresponding layer,
responsive to inputting the layered prompt, receiving, from the AI model, a layer-specific model response, and
using the received layer-specific model response, comparing a layer-specific expected response of the layered prompt to the layer-specific model response received from the AI model,
wherein subsequent assessments of the set of assessments occurring subsequent to previous assessments of the set of assessments are dynamically constructed using the comparison of the layer-specific expected response of the previous assessments to the layer-specific model response received from the AI model for the previous assessments; and
using the evaluation of the AI model, assign a score, for each layer, to the AI model, by:
for each assessment, comparing the layer-specific expected response of the assessment to the layer-specific model response received from the AI model, and
using the comparisons, determining a particular degree of satisfaction of the AI model with the one or more guidelines associated with the corresponding assessment, in accordance with the set of benchmarks for the corresponding layer.

16. The system of claim 15, wherein the set of guidelines include one or more of: governmental regulations of a specific jurisdiction, organization-specific regulations, or AI application type-specific guidelines.

17. The system of claim 15,
wherein the layer-specific model response of the AI model includes a layer-specific model outcome and a layer-specific model explanation of how the layer-specific model outcome was determined,
wherein the layer-specific expected response of each assessment includes a layer-specific expected outcome and a layer-specific expected explanation of how the layer-specific expected outcome was determined, and
wherein comparing the layer-specific expected response of a particular assessment to the layer-specific model response received from the AI model includes:
comparing the layer-specific expected outcome of the particular assessment to the layer-specific model outcome received from the AI model, and
responsive to the layer-specific expected outcome of the particular assessment satisfying the layer-specific model outcome received from the AI model, comparing the layer-specific expected explanation of the particular assessment to the corresponding layer-specific model explanation of the layer-specific model outcome.

18. The system of claim 15, the operations further comprising:
receiving a subset of layers within the set of layers; and
presenting a subset of the assigned scores using a particular view scope,
wherein the particular view scope filters the set of assigned scores using the subset of layers.

19. The system of claim 15, the operations further comprising:
using the degrees of satisfaction, generating a modification plan associated with the AI model,
wherein implementing the modification plan increases the degree of satisfaction of the AI model with the operation boundaries in the set of guidelines.

20. The system of claim 15, the operations further comprising:
storing the set of assessments for each layer in the set of layers in a vector space representation,
wherein the set of assessments are stored in a structured format.

* * * * *